United States Patent
Li et al.

(10) Patent No.: US 9,951,157 B2
(45) Date of Patent: Apr. 24, 2018

(54) SPHERICAL CARRIERS FOR OLEFIN POLYMERIZATION CATALYST, CATALYST COMPONENTS, CATALYST, AND PREPARATION METHODS THEREFOR

(71) Applicants: China Petroleum & Chemical Corporation, Beijing (CN); Beijing Research Institute of Chemical Industry, China Petroleum & Chemical Corporation, Beijing (CN)

(72) Inventors: Weili Li, Beijing (CN); Xianzhi Xia, Beijing (CN); Yuexiang Liu, Beijing (CN); Yongtai Ling, Beijing (CN); Jin Zhao, Beijing (CN); Jigui Zhang, Beijing (CN); Futang Gao, Beijing (CN); Ping Gao, Beijing (CN); Yang Tan, Beijing (CN); Renqi Peng, Beijing (CN); Zhihui Zhang, Beijing (CN); Jie Lin, Beijing (CN); Ruilin Duan, Beijing (CN); Changyou Ma, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 15/030,000

(22) PCT Filed: Oct. 17, 2014

(86) PCT No.: PCT/CN2014/088806
§ 371 (c)(1),
(2) Date: Apr. 15, 2016

(87) PCT Pub. No.: WO2015/055136
PCT Pub. Date: Apr. 23, 2015

(65) Prior Publication Data
US 2016/0251457 A1  Sep. 1, 2016

(30) Foreign Application Priority Data

Oct. 18, 2013 (CN) .......................... 2013 1 0491393
Oct. 18, 2013 (CN) .......................... 2013 1 0491641
Oct. 18, 2013 (CN) .......................... 2013 1 0491648

(51) Int. Cl.
*C08F 10/06* (2006.01)
*C08F 110/06* (2006.01)

(52) U.S. Cl.
CPC ............ *C08F 10/06* (2013.01); *C08F 110/06* (2013.01); *C08F 2410/01* (2013.01)

(58) Field of Classification Search
None
See application file for complete search history.

(56) References Cited

U.S. PATENT DOCUMENTS 6,323,152 B1    11/2001  Sacchetti et al.
2005/0176900 A1  8/2005  Zhu
(Continued)

FOREIGN PATENT DOCUMENTS

CL    201201335    11/2012
CN    1552742 A    12/2004
(Continued)

OTHER PUBLICATIONS

Machine Translation of CN 102010681A.*
(Continued)

*Primary Examiner* — Catherine S Branch
(74) *Attorney, Agent, or Firm* — Duane Morris LLP

(57) ABSTRACT

Spherical carriers for an olefin polymerization catalyst, catalyst components, catalysts, and preparation methods therefor are disclosed. The method for preparing the spherical carriers comprises the following steps: (1) reacting, in the presence of at least one polymeric dispersion stabilizer, a magnesium halide with an organic compound containing
(Continued)

active hydrogen to form a complex solution; (2) reacting said complex solution with an alkylene oxide-type compound to directly precipitate solid particles; and (3) recovering the solid particles to obtain spherical carriers. When a catalyst prepared by using the present spherical carrier is used in propylene polymerization, said catalyst exhibits high polymerization activity and high stereo-directing ability.

23 Claims, 3 Drawing Sheets

(56) References Cited

U.S. PATENT DOCUMENTS

| | | |
|---|---|---|
| 2012/0252992 A1 | 10/2012 | Li et al. |
| 2012/0264590 A1 | 10/2012 | Li et al. |
| 2012/0277090 A1 | 11/2012 | Spencer |

FOREIGN PATENT DOCUMENTS

| | | | |
|---|---|---|---|
| CN | 101544710 A | | 9/2009 |
| CN | 101724101 A | | 6/2010 |
| CN | 102040680 A | | 5/2011 |
| CN | 102040681 A | | 5/2011 |
| CN | 102137876 A | | 7/2011 |
| CN | 102276765 A | | 12/2011 |
| CN | 102453127 A | * | 5/2012 |
| CN | 102453128 A | | 5/2012 |
| CN | 102453128 B | | 7/2013 |
| CN | 102124036 B | | 8/2013 |
| EP | 1083187 A1 | | 3/2001 |
| EP | 1609805 A1 | | 12/2005 |
| EP | 2489684 A1 | | 8/2012 |
| EP | 2489685 A1 | | 8/2012 |
| EP | 2562189 A1 | | 2/2013 |
| ES | 2557178 R1 | | 1/2016 |
| JP | S61138604 A | | 6/1986 |
| JP | 2013507491 A | | 3/2013 |
| JP | 2013507492 A | | 3/2013 |
| JP | 5623535 B2 | | 11/2014 |
| KR | 20120089324 A | | 8/2012 |
| KR | 20120091220 A | | 8/2012 |
| WO | WO2003082930 A2 | | 10/2003 |
| WO | WO2011044760 A1 | | 4/2011 |
| WO | WO2011044761 A1 | | 4/2011 |
| WO | 2012149360 A1 | | 11/2012 |
| WO | 2013082631 A1 | | 11/2012 |

OTHER PUBLICATIONS

Polydimethylsiloxane Information Sheet (1992).*
Machine Translation of CN 102453127A.*
Pharmaceutics: Basic Principles and Application to Pharmacy Practice, Dash et al. (eds.), Elsevier 2014, p. 182.*
International Search Report for PCT/CN2014/088806 dated Jan. 23, 2015.
EP 2489684 A4 (Supplementary European Search Report for EP Application No. 10 82 2993, dated Sep. 30, 2013).
EP 2489685 A4 (Supplementary European Search Report for EP Application No. 10 82 2992, dated Dec. 17, 2013).
The Extended European Search Report to Application No. 14854726.8, dated May 11, 2017.
Notification of the Substantive Examination Report for Saudi Patent Application No. 516370961 filed Apr. 17, 2016 issued date unknown.

* cited by examiner

SPHERICAL CARRIERS FOR OLEFIN POLYMERIZATION CATALYST, CATALYST COMPONENTS, CATALYST, AND PREPARATION METHODS THEREFOR

CROSS REFERENCE OF RELATED APPLICATIONS

The present application claims the benefit of the Chinese Patent Application Nos. 201310491393.6, 201310491641.7 and 201310491648.9, filed on Oct. 18, 2013, which are incorporated herein by reference in their entirety and for all purposes.

FIELD OF THE INVENTION

The present invention relates to a spherical carrier for olefin polymerization catalyst, a catalyst component, a catalyst, and preparation methods therefor.

BACKGROUND ART

Most of catalysts for olefin polymerization are prepared by supporting a titanium halide on an active magnesium chloride. A common method used to prepare the active magnesium chlorides is to react anhydrous $MgCl_2$ with an alcohol to form a magnesium chloride-alcohol adduct of general formula: $MgCl_2 \cdot mROH \cdot nH_2O$. Then, a titanium halide is supported on such an adduct to afford a solid catalyst component for olefin polymerization. Such alcohol adducts may be prepared by known processes, such as spray drying process, spray cooling process, high-pressure extruding process, or high-speed stirring process. See, for example, U.S. Pat. Nos. 4,421,674, 4,469,648, WO8707620, WO9311166, U.S. Pat. Nos. 5,100,849, 6,020,279, 4,399,054, EP0395383, U.S. Pat. Nos. 6,127,304 and 6,323,152.

Other magnesium-containing complex carriers useful in the preparation of catalysts for olefin polymerization are also known in the art. For example, CN102040681A discloses a compound that can be used as a carrier of catalysts for olefin polymerization, having a structure of:

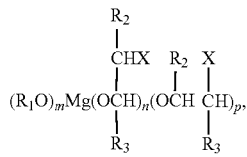

wherein $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl; X's are chlorine or bromine, and one of the X's may be $C_1$-$C_{14}$ alkyl, $C_1$-$C_{14}$ alkoxy, $C_6$-$C_{14}$ aryl or $C_6$-$C_{14}$ aroxy; m is in a range of from 0.1 to 1.9, n is in a range of from 0.1 to 1.9, and p+m+n=2. Said compound is prepared as follows: $MgX_2$ reacts with an alcohol of general formula $R_1OH$ in the presence of an inert dispersion medium at 30 to 160° C., to form a magnesium halide-alcohol adduct solution; then the solution reacts with an oxirane compound at 30 to 160° C., to form the magnesium compound useful as a carrier, wherein X is chlorine or bromine, $R_1$ is a $C_1$-$C_{12}$ linear or branched alkyl. CN102040680A also discloses an olefin polymerization catalyst, which is prepared by using said compound useful as a carrier of olefin polymerization catalyst disclosed in the above-mentioned patent application.

There is still need to a magnesium-containing complex or spherical carrier that can be used in the preparation of a catalyst component for olefin polymerization and a method by which such a magnesium-containing complex or spherical carrier can be simply, effectively, and low-costly prepared. There is also still need to a catalyst component for olefin polymerization that exhibits desired properties, such as high activity and high stereo-directing ability.

SUMMARY OF THE INVENTION

An object of the invention is to provide a method for preparing a solid composition (typically spherical carrier) that is useful in the preparation of an olefin polymerization catalyst.

A further object of the invention is to provide a solid composition (typically spherical carrier) prepared by the above method.

A still further object of the invention is to provide a catalyst component for olefin polymerization that is prepared by using said solid composition as a carrier.

A still further object of the invention is to provide a catalyst for olefin polymerization comprising said catalyst component.

A still further object of the invention is to provide use of the catalyst in olefin polymerization.

In some embodiments, the present invention provides a method for preparing a spherical carrier that is useful in the preparation of an olefin polymerization catalyst, which method comprises reacting at least the following components: (a) a magnesium halide, (b) an organic compound containing active hydrogen, and (c) an epoxide, in the presence of at least one polymeric dispersion stabilizer, to directly precipitate a particulate solid product.

In some embodiments, the present invention provides a spherical carrier prepared by the above-described method.

In some embodiments, the present invention provides a process for preparing a solid composition that is useful in the preparation of a catalyst component for olefin polymerization, comprising the steps of:

(a) reacting a magnesium halide of formula $MgX_2$ with an alcohol of formula $R_1OH$ in the presence of at least one polymeric dispersion stabilizer at 30 to 160° C., to form a magnesium halide-alcohol adduct solution; and (b) reacting the magnesium halide-alcohol adduct solution with an epoxide represented by formula (2):

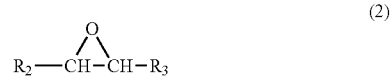

at 30 to 160° C., to directly precipitate particles of the solid composition, wherein, X is halogen; $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl, and wherein, relative to one mole of the magnesium halide, the amount of the alcohol used ranges from 3 to 30 moles and the amount of the epoxide represented by the formula (2) used ranges from 1 to 10 moles; and the polymeric dispersion stabilizer is used in an amount of from 0.1 to 10 wt %, based on the total weight of the magnesium halide and the alcohol.

In some embodiments, the present invention provides a solid composition prepared by the above-described process.

In some embodiments, said solid composition comprises a magnesium compound represented by formula (1) and an epoxide represented by formula (2),

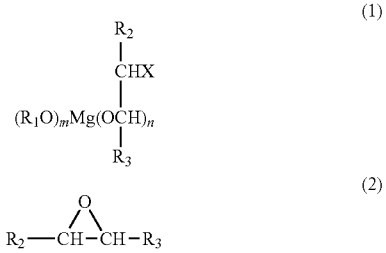

wherein, $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2; and wherein the content of the epoxide represented by the formula (2) is in a range of from 0.01 to 0.8 moles per mole of the magnesium compound represented by the formula (1).

In some embodiments, the present invention provides a catalyst component for olefin polymerization, comprising reaction products of the following components:

(1) a solid composition, which is the spherical carrier or solid composition according to the invention;

(2) at least one titanium compound; and (3) optionally, at least one internal electron donor.

In some embodiments, the present invention provides a method for preparing the catalyst component, which method comprises the steps of:

(1) providing the spherical carrier/solid composition according to the invention; and (2) contacting and reacting the spherical carrier/solid composition with a titanium compound in the presence or absence of an inert solvent, and optionally adding at least one internal electron donor at one or more stages before, during and/or after the reaction.

In some embodiments, the present invention provides a catalyst for olefin polymerization, comprising:

(i) the catalyst component for olefin polymerization according to the present invention;

(ii) at least one alkyl aluminum compound; and (iii) optionally, at least one external electron donor.

In some embodiments, the present invention provides use of the catalyst for olefin polymerization in olefin polymerization reaction.

By means of these technical solutions, the present invention achieves the following virtues:

(1) in the preparation of the solid composition or spherical carrier, solid particles having good particle morphology and narrow particle size distribution can be obtained without adding an inert dispersion medium, thereby enhancing the solid composition or spherical carrier output of unit volume of reactor;

(2) compared to the inert dispersion media used in the prior art, the polymeric dispersion stabilizer used in the preparation of the solid composition or spherical carrier can be recovered more easily, thereby reducing the costs associated with the recovering;

(3) when the catalysts for olefin polymerization according to the invention are used in olefin polymerization (especially propylene polymerization or copolymerization), the resultant polymers have relatively high isotacticities; and (4) the catalysts for olefin polymerization according to the invention exhibit high activities.

These and other features and virtues of the invention will be apparent from the following descriptions in details.

BRIEF DESCRIPTION OF DRAWINGS

The drawings are provided to further illustrate the invention and constitute a part of the specification. The drawings and the following description together explain the invention, but do not limit the invention. In the drawings.

DETAILED DESCRIPTION OF THE PREFERRED EMBODIMENTS

Figure 1:
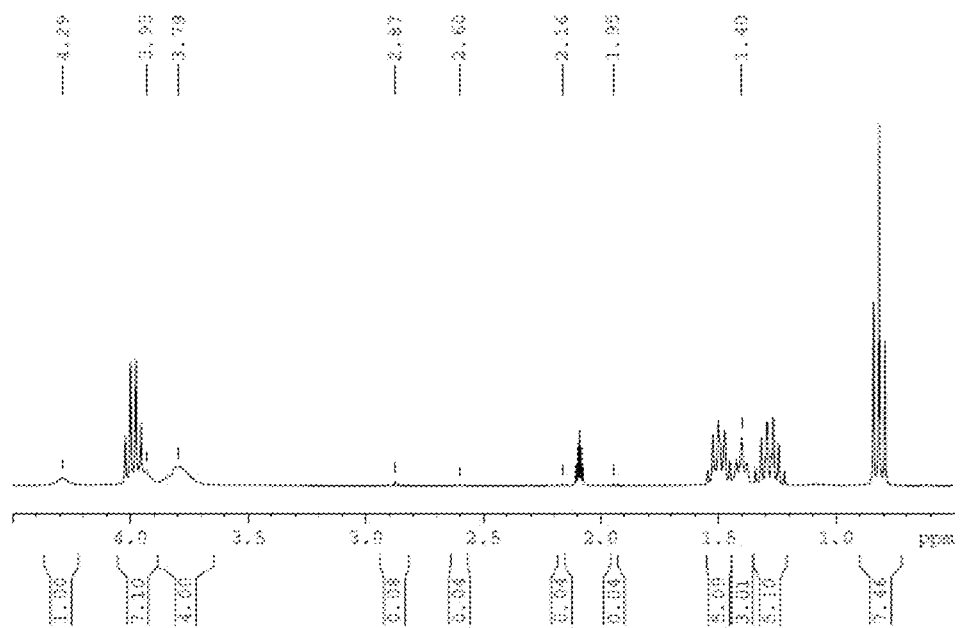
FIG. 1 shows a $^1$H-NMR spectrum of the spherical carrier prepared in Example 1.

As used herein, the term "spherical carrier" means that the carrier is of sphere-like particle shape, but does not require that the carrier is of perfect spherical shape.

As used herein, the term "carrier" means a material that does not possess activity for olefin polymerization, that is, the carrier does not comprise an active component that may catalyze the polymerization of an olefin, such as a titanium compound.

As used herein, the expression "directly precipitate a solid product" has the following meanings:

(1) the solid product is precipitated through chemical reaction, that is, in the preparation, the solid product is directly precipitated, through chemical reaction, from the original system, and there is no need to the use of other means such as vaporizing a solvent or altering system temperature (such as spray drying, reducing system temperature) in order to precipitate solid particles from the reactants; and (2) the acquirement of the shape (typically spherical shape) of the solid product can be achieved without needing to introduce an inert carrier material having good particle morphology (for example, $SiO_2$, metal oxides, or the like) in the preparation.

In a first aspect, the present invention provides a method for preparing a solid composition that is useful in the preparation of an olefin polymerization catalyst component and that is typically of spherical shape, which method comprises reacting at least the following components: (a) a magnesium halide, (b) an organic compound containing active hydrogen, and (c) an epoxide, in the presence of at least one polymeric dispersion stabilizer, to directly precipitate a solid product.

In a preferred embodiment, the method for preparing the solid composition according to the invention comprises:

(1) reacting the magnesium halide with the organic compound containing active hydrogen in the presence of the at least one polymeric dispersion stabilizer to form a complex solution; and (2) reacting the complex solution with the epoxide to directly precipitate solid particles.

In step (1), the amount of the organic compound containing active hydrogen used may range from 3 to 30 moles, and preferably from 4 to 20 moles, relative to one mole of the magnesium halide.

According to the invention, the amount of the polymeric dispersion stabilizer used may range from 0.1 to 10 wt %, and preferably from 0.2 to 5 wt %, based on the total weight of the magnesium halide and the organic compound containing active hydrogen.

Reaction conditions of step (1) may include: a reaction temperature of from 30 to 160° C., and preferably from 40 to 120° C.; and a reaction time of from 0.1 to 5 hours, and preferably from 0.5 to 2 hours. The reaction in step (1) may be carried out in a conventional reactor or vessel. Preferably, the reaction in step (1) is carried out in a closed vessel, for example, reaction kettle.

The magnesium halide used in the method according to the invention is of general formula $MgX_2$, wherein X is halogen, and preferably bromine, chlorine or iodine. More preferably, the magnesium halide is at least one chosen from magnesium dichloride, magnesium dibromide and magnesium diiodide, and most preferably magnesium dichloride.

The organic compound containing active hydrogen used in the method according to the invention is preferably an alcohol of formula $R_1OH$, wherein $R_1$ is preferably a $C_1$-$C_8$ linear or branched alkyl, more preferably a $C_2$-$C_5$ linear or branched alkyl, such as ethyl, propyl, butyl or pentyl. Particularly, the alcohol may be, for example, at least one chosen from methanol, ethanol, propanol, isopropanol, n-butanol, isobutanol, pentanol, isopentanol, n-hexanol, n-octanol, and 2-ethylhexanol.

According to the invention, there is no specific limitation on the molecular weight of the polymeric dispersion stabilizer. However, it is preferred that the polymeric dispersion stabilizer has a weight average molecular weight of larger than 1,000, more preferably larger than 3,000, and still more preferably from 6,000 to 2,000,000. Particularly, the polymeric dispersion stabilizer may be at least one chosen from polyacrylates, styrene-maleic anhydride copolymers, polystyrene sulfonates, naphthalenesulfonic acid-formaldehyde condensation products, condensed alkyl phenyl ether sulfates, condensed alkylphenol polyoxyethylene ether phosphates, oxy alkyl acrylate copolymer-modified polyethyleneimines, poly(1-dodecyl-4-vinylpyridinium bromide)s, poly(vinylbenzyl trimethyl ammonium salt)s, poly(vinyl alcohol)s, polyacrylamides, ethylene oxide-propylene oxide block copolymers, polyvinylpyrrolidones (PVPs), poly(vinylpyrrolidone-co-vinyl acetate)s, poly(ethylene glycol)s (PEGs), alkylphenyl polyoxyethylene ethers and poly(alkyl methylacrylate)s, preferably at least one of polyvinylpyrrolidone, poly(vinylpyrrolidone-co-vinyl acetate)s and poly(ethylene glycol)s.

According to the invention, the magnesium halide, the organic compound containing active hydrogen and the polymeric dispersion stabilizer may participate, in a form comprising a minor amount of water, in the formation of the magnesium halide-alcohol adduct solution. So-called "minor amount of water" means water inevitably introduced during industrial production or storage or transportation, but not added purposely.

In step (1), the magnesium halide, the organic compound containing active hydrogen and the polymeric dispersion stabilizer may be added in any addition order.

In the method according to the invention, the amount of the epoxide used may range from 1 to 10 moles, and preferably from 2 to 6 moles, relative to one mole of the magnesium halide.

Reaction conditions of step (2) may include: a reaction temperature of from 30 to 160° C., and preferably from 40 to 120° C.; and a reaction time of from 0.1 to 5 hours, and preferably from 0.2 to 1 hour.

The epoxide used in the method according to the invention is preferably a compound represented by formula (2):

(2)

wherein $R_2$ and $R_3$ are identical or different, and are each independently hydrogen or unsubstituted or halogen-substituted $C_1$-$C_5$ linear or branched alkyl, more preferably hydrogen or unsubstituted or halogen-substituted $C_1$-$C_3$ linear or branched alkyl, and still more preferably hydrogen, methyl, ethyl, propyl, chloromethyl, chloroethyl, chloropropyl, bromomethyl, bromoethyl or bromopropyl. Particularly, the epoxide may be at least one chosen from epoxy ethane, epoxy propane, epoxy butane, epoxy chloropropane, epoxy chlorobutane, epoxy bromopropane, and epoxy bromobutane.

In the method according to the invention, an inert dispersion medium is optionally used in step (1) and/or step (2). The inert dispersion medium is ones commonly used in the art. For example, the inert dispersion medium may be at least one chosen from liquid aliphatic, aromatic or alicyclic hydrocarbons and silicone oils. Particularly, the inert dispersion medium may be at least one of liquid linear or branched alkanes having a carbon chain length larger than 6 carbons, aromatic hydrocarbons (for example, toluene), kerosenes, paraffin oils, vaseline oils, white oils, and methylsilicone oils. When the inert dispersion medium is used in step (1) and/or step (2), a volume ratio of the inert dispersion medium to the organic compound containing active hydrogen may range from 1:0.2 to 1:20, and preferably from 1:0.5 to 1:10. In a preferred embodiment, no inert dispersion medium is used in both steps (1) and (2).

In the method according to the invention, in the course of the reaction of the feeds including at least the component (a), the component (b) and the component (c), a conventional additive component, such as an electron donor, may be introduced in addition to the components (a), (b) and (c). The electron donor may be an electron donor compound conventionally used in the art, such as ethers, esters, ketones, aldehydes, amines, amides, alkoxysilanes, and the like, and preferably at least one of ethers, esters, and alkoxysilanes.

In the method according to the invention, it is preferred that no titanium tetrachloride is introduced in the course of the reaction of the feeds including at least the component (a), the component (b) and the component (c).

In some preferred embodiments, the method for preparing the solid composition comprises the steps of:

(1) reacting the magnesium halide of formula $MgX_2$ with the alcohol of formula $R_1OH$ in the presence of the at least one polymeric dispersion stabilizer at 30 to 160° C., to form a magnesium halide-alcohol adduct solution; and (2) reacting the magnesium halide-alcohol adduct solution with the epoxide represented by the formula (2) at 30 to 160° C., to directly precipitate particles of the solid composition, wherein, X is halogen; $R_1$ is a $C_1$-$C_{12}$ linear or branched alky, and wherein, relative to one mole of the magnesium halide, the amount of the alcohol used ranges from 3 to 30 moles and the amount of the epoxide represented by the formula (2) used ranges from 1 to 10 moles, and the polymeric dispersion stabilizer is used in an amount of from 0.1 to 10 wt %, based on the total weight of the magnesium halide and the alcohol. Preferably, relative to one mole of the magnesium halide, the amount of the alcohol used ranges from 4 to 20 moles and the amount of the epoxide represented by the formula (2) used ranges from 2 to 6 moles, and the polymeric dispersion stabilizer is used in an amount of from 0.2 to 5 wt %, based on the total weight of the magnesium halide and the alcohol.

In these preferred embodiments, the reaction time for step (1) may range from 0.1 to 5 hours, and preferably from 0.5 to 2 hours; and the reaction time for step (2) may range from 0.1 to 5 hours, and preferably from 0.2 to 1 hour.

In some specific embodiments, the method for preparing a solid composition comprises the steps of:

(1) reacting the magnesium halide of formula $MgX_2$ with the alcohol of formula $R_1OH$ in the presence of the at least one polymeric dispersion stabilizer at 30 to 160° C., preferably 40 to 120° C., in a closed vessel for 0.1 to 5 hours, preferably 0.5 to 2 hours, to form a magnesium halide-alcohol adduct solution, i.e., the complex solution;

(2) reacting the magnesium halide-alcohol adduct solution with the epoxide represented by the formula (2) at 30 to 160° C., preferably 40 to 120° C., for 0.1 to 5 hours, preferably 0.2 to 1 hour, to directly precipitate solid particles; and (3) recovering the solid particles via a solid-liquid separation technique, to obtain a solid composition product.

In other specific embodiments, the method for preparing a solid composition comprises the steps of:

(1) heating a mixture of the magnesium halide, the alcohol and the at least one polymeric dispersion stabilizer in a closed vessel with stirring to a temperature of from 30 to 160° C., and preferably from 40 to 120° C., and allowing the mixture to react for 0.1 to 5 hours, and preferably 0.5 to 2 hours, to form the magnesium halide-alcohol adduct solution, wherein the amount of the alcohol used ranges from 3 to 30 moles, and preferably from 4 to 25 moles, per mole of the magnesium halide, and the amount of the polymeric dispersion stabilizer used is from 0.1 to 10 wt %, and preferably from 0.2 to 5 wt %, based on the total weight of the magnesium halide and the alcohol; and (ii) adding the epoxide represented by the formula (2) to the magnesium halide-alcohol adduct solution with stirring, and allowing the mixture to react at 30 to 160° C., and preferably 40 to 120° C., for 0.1 to 5 hours, preferably 0.2 to 1 hour, and more preferably 0.3 to 1 hour, to directly precipitate solid particles, wherein the amount of the epoxide used ranges from 1 to 10 moles, and preferably from 2 to 6 moles, per mole of the magnesium halide; and (3) recovering the solid particles via a solid-liquid separation technique, to obtain a solid composition product.

In the method according to the invention, the recovering of the solid particles may be accomplished by a conventional solid-liquid separation technique known in the art, for example, filtration, decantation, or centrifugalization. In addition, step (3) may further comprise washing the obtained solid composition particles with an inert hydrocarbon solvent and drying. The inert hydrocarbon solvent is preferably a liquid alkane having a carbon chain length larger than 4 carbons or an aromatic hydrocarbon, for example, hexane, heptane, octane, decane, toluene, or the like.

In a second aspect, the present invention provides a solid composition prepared by the method described-above. The solid composition is typically of spherical shape and can be used, as a carrier, in the preparation of a catalyst component for olefin polymerization.

In some embodiments, the solid composition comprises a magnesium compound represented by formula (1) and an epoxide represented by formula (2),

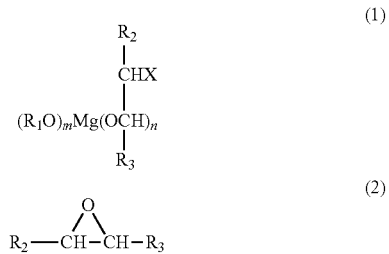

wherein, $R_1$ is a $C_1$-$C_{12}$ linear or branched alkyl, preferably a $C_1$-$C_8$ linear or branched alkyl, and more preferably a $C_2$-$C_5$ linear or branched alkyl, such as ethyl, propyl, butyl or pentyl; $R_2$ and $R_3$ are identical or different, and are independently hydrogen or unsubstituted or halogen-substituted $C_1$-$C_5$ linear or branched alkyl, preferably hydrogen or unsubstituted or halogen-substituted $C_1$-$C_3$ linear or branched alkyl, and more preferably hydrogen, methyl, ethyl, propyl, chloromethyl, chloroethyl, chloropropyl, bromomethyl, bromoethyl or bromopropyl; X is halogen, preferably bromine, chlorine or iodine, and more preferably chlorine; m is in a range of from 0.1 to 1.9, and preferably from 0.5 to 1.5, n is in a range of from 0.1 to 1.9, and preferably from 0.5 to 1.5, m+n=2, and most preferably, m is 1 and n is 1; and wherein the content of the epoxide represented by the formula (2) is in a range of from 0.01 to 0.8 moles, preferably from 0.02 to 0.5 moles, and more preferably from 0.02 to 0.3 moles, per mole of the magnesium compound represented by the formula (1).

The epoxide represented by the formula (2) is as described above.

In some embodiments, the solid composition consists essentially of the magnesium compound represented by the formula (1) and the epoxide represented by the formula (2), and comprises optionally a trace amount of the polymeric dispersion stabilizer.

The solid composition is preferably present in the form of spherical particle and has an average particle size (D50) of preferably from 30 to 125 μm, and more preferably from 40 to 85 μm. The solid composition has preferably a particle size distribution value (SPAN=(D90−D10)/D50) of from 0.6 to 2.5, and more preferably from 0.6 to 0.85. The average particle size and the particle size distribution value of the solid composition may be measured on Masters Sizer Model 2000 (manufactured by Malvern Instruments Co., Ltd.).

In a third aspect, the present invention provides a catalyst component for olefin polymerization, comprising reaction products of the following components:

(1) the above-described solid composition according to the invention;

(2) at least one titanium compound; and (3) optionally, at least one internal electron donor.

In some embodiments, the catalyst component according to the invention is characterized in that the solid composition comprises a magnesium compound represented by formula (1) and an epoxide represented by formula (2),

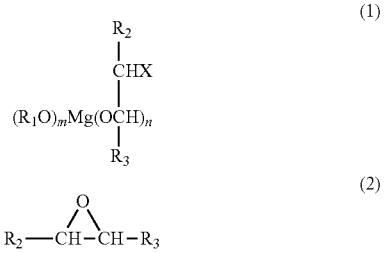

wherein, $R_1$ is a $C_1$-$C_{12}$ linear or branched alkyl, preferably a $C_1$-$C_8$ linear or branched alkyl, and more preferably a $C_2$-$C_5$ linear or branched alkyl, such as ethyl, propyl, butyl or pentyl; $R_2$ and $R_3$ are identical or different, and are independently hydrogen or unsubstituted or halogen-substituted $C_1$-$C_5$ linear or branched alkyl, preferably hydrogen or unsubstituted or halogen-substituted $C_1$-$C_3$ linear or branched alkyl, and more preferably hydrogen, methyl, ethyl, propyl, chloromethyl, chloroethyl, chloropropyl, bromomethyl, bromoethyl or bromopropyl; X is halogen, preferably bromine, chlorine or iodine, and more preferably chlorine; m is in a range of from 0.1 to 1.9, and preferably from 0.5 to 1.5, n is in a range of from 0.1 to 1.9, and preferably from 0.5 to 1.5, m+n=2, and most preferably, m is 1 and n is 1; and wherein the content of the epoxide represented by the formula (2) is in a range of from 0.01 to 0.8 moles, preferably from 0.02 to 0.5 moles, and more preferably from 0.02 to 0.3 moles, per mole of the magnesium compound represented by the formula (1).

Preferably, the epoxide represented by the formula (2) is at least one of epoxy ethane, epoxy propane, epoxy butane, epoxy chloropropane, epoxy chlorobutane, epoxy bromopropane, and epoxy bromobutane.

In some embodiments, in the reaction to form the catalyst component, relative to one mole of the magnesium compound represented by the formula (1) in the solid composition, the titanium compound is used in an amount of from 5 to 200 moles, and preferably from 10 to 100 moles, and the internal electron donor is used in an amount of from 0 to 0.5 moles, and preferably from 0.08 to 0.4 moles.

The titanium compound may be any titanium compound commonly used in the art. For example, the titanium compound may be chosen from those represented by a formula: $Ti(OR_4)_{4-a}X_a$, wherein $R_4$ may be a $C_1$-$C_{14}$ aliphatic hydrocarbyl, preferably a C1-C8 alkyl, such as methyl, ethyl, propyl, butyl, pentyl, hexyl, heptyl, or the like, X may be halogen, such as F, Cl, Br, I or a combination thereof, and a is an integer ranging from 0 to 4. Preferably, the titanium compound is chosen from titanium tetrachloride, titanium tetrabromide, titanium tetraiodide, tetrabutoxy titanium, tetraethoxy titanium, tributoxy titanium chloride, dibutoxy titanium dichloride, butoxy titanium trichloride, triethoxy titanium chloride, diethoxy titanium dichloride, and ethoxy titanium trichloride.

The internal electron donor may be any of the internal electron donor compounds commonly used in the art. For example, the internal electron donor may be chosen from esters, ethers, ketones, amines and silanes. Preferably, the internal electron donor is chosen from esters of aliphatic and aromatic mono- and poly-basic carboxylic acids, esters of diol, and di-ethers.

Preferably, the esters of aliphatic and aromatic mono- and poly-basic carboxylic acids are chosen from benzoates, phthalates, malonates, succinates, glutarates, adipates, sebacates, maleates, naphthalene dicarboxylates, trimellitates, benzene-1,2,3-tricarboxylates, and pyromellitates. More preferably, the esters of aliphatic and aromatic mono- and poly-basic carboxylic acids are chosen from ethyl benzoate, diethyl phthalate, di-iso-butyl phthalate, di-n-butyl phthalate, di-iso-octyl phthalate, di-n-octyl phthalate, diethyl malonate, dibutyl malonate, diethyl 2,3-di-iso-propylsuccinate, di-iso-butyl 2,3-di-isopropylsuccinate, di-n-butyl 2,3-diisopropylsuccinate, dimethyl 2,3-di-isopropylsuccinate, di-iso-butyl 2,2-dimethylsuccinate, di-iso-butyl 2-ethyl-2-methylsuccinate, diethyl 2-ethyl-2-methylsuccinate, diethyl adipate, dibutyl adipate, diethyl sebacate, dibutyl sebacate, diethyl maleate, di-n-butyl maleate, diethyl naphthalene dicarboxylate, dibutyl naphthalene dicarboxylate, triethyl trimellitate, tributyl trimellitate, triethyl benzene-1,2,3-tricarboxylate, tributyl benzene-1,2,3-tricarboxylate, tetraethyl pyromellitate, and tetrabutyl pyromellitate.

Preferably, the ester of diol is chosen from those represented by formula (IV),

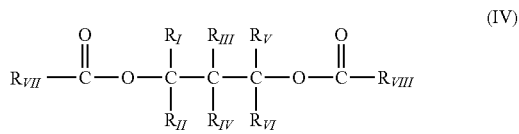

wherein $R_I$-$R_{VI}$ are identical or different, and are independently chosen from hydrogen, $C_1$-$C_{10}$ linear or branched alkyl, $C_3$-$C_{10}$ cycloalkyl, $C_6$-$C_{10}$ aryl, $C_7$-$C_{10}$ alkaryl and $C_7$-$C_{10}$ aralkyl; two or more groups of $R_I$-$R_{VI}$ may be linked to form one or more ring structures; $R_{VII}$ and $R_{VIII}$ are identical or different, and are independently chosen from $C_1$-$C_{10}$ linear or branched alkyl, $C_3$-$C_{20}$ cycloalkyl, $C_6$-$C_{20}$ aryl, $C_7$-$C_{20}$ alkaryl and $C_7$-$C_{20}$ aralkyl, wherein hydrogen atom(s) on the phenyl ring in the aryl, alkaryl or aralkyl is/are optionally replaced with halogen atom(s).

In the formula (IV), it is preferred that $R_I$, $R_{II}$, $R_V$ and $R_{VI}$ are not simultaneously hydrogen; it is more preferred that at least one of $R_I$, $R_{II}$, $R_V$ and $R_{VI}$ is hydrogen; and it is still more preferred that one of $R_I$ and $R_{II}$ is hydrogen and the other is methyl, ethyl, propyl, isopropyl, butyl, tert-butyl, phenyl or halophenyl; and one of $R_V$ and $R_{VI}$ is hydrogen and the other is methyl, ethyl, propyl, isopropyl, butyl, tert-butyl, phenyl or halophenyl.

Preferably, the ester of diol is chosen from 1,3-propylene glycol dibenzoate, 2-methyl-1,3-propylene glycol dibenzoate, 2-ethyl-1,3-propylene glycol dibenzoate, 2,2-dimethyl-1,3-propylene glycol dibenzoate, (R)-1-phenyl-1,3-propylene glycol dibenzoate, 1,3-diphenyl-1,3-propylene glycol dibenzoate, 1,3-diphenyl-1,3-propylene glycol dipropionate, 2-methyl-1,3-diphenyl-1,3-propylene glycol dipropionate, 2-methyl-1,3-diphenyl-1,3-propylene glycol diacetate, 2,2-dimethyl-1,3-diphenyl-1,3-propylene glycol dibenzoate, 2,2-dimethyl-1,3-diphenyl-1,3-propylene glycol dipropionate, 1,3-di-tert-butyl-2-ethyl-1,3-propylene glycol dibenzoate, 1,3-diphenyl-1,3-propylene glycol diacetate, 1,3-diisopropyl-1,3-propylene glycol di-4-butylbenzoate, 2-amino-1-phenyl-1,3-propylene glycol dibenzoate, 2-methyl-1-phenyl-1,3-butylene glycol dibenzoate, phenyl-2-methyl-1,3-butylene glycol dipivalate, 3-butyl-2,4-pentylene glycol dibenzoate, 3,3-dimethyl-2,4-pentylene glycol dibenzoate, (2S,4S)-(+)-2,4-pentylene glycol dibenzoate, (2R,4R)-(+)-2,4-pentylene glycol dibenzoate, 2,4-pentylene glycol di-p-chlorobenzoate, 2,4-pentylene glycol di-m-chlorobenzoate, 2,4-pentylene glycol di-p-bromobenzoate, 2,4-pentylene glycol di-o-bromobenzoate, 2,4-pentylene glycol di-p-methylbenzoate, 2,4-pentylene glycol di-p-tert-butylbenzoate, 2,4-pentylene glycol di-p-butylbenzoate, 2-methyl-1,3-pentylene glycol di-p-chlorobenzoate, 2-methyl-1,3-pentylene glycol di-p-methylbenzoate, 2-butyl-1,3-pentylene glycol di-p-methylbenzoate, 2-methyl-1,3-pentylene glycol di-p-tert-butylbenzoate, 2-methyl-1,3-pentylene glycol pivalate, 2-methyl-1,3-pentylene glycol monobenzoate monocinnamate, 2,2-dimethyl-1,3-pentylene glycol dibenzoate, 2,2-dimethyl-1,3-pentylene glycol monobenzoate monocinnamate, 2-ethyl-1,3-pentylene glycol dibenzoate, 2-butyl-1,3-pentylene glycol dibenzoate, 2-allyl-1,3-pentylene glycol dibenzoate, 2-methyl-1,3-pentylene glycol dibenzoate, 2-ethyl-1,3-pentylene glycol dibenzoate, 2-propyl-1,3-pentylene glycol dibenzoate, 2-butyl-1,3-pentylene glycol dibenzoate, 2,2-dimethyl-1,3-pentylene glycol dibenzoate, 1,3-pentylene glycol di-p-chlorobenzoate, 1,3-pentylene glycol di-m-chlorobenzoate, 1,3-pentylene glycol di-p-bromobenzoate, 1,3-pentylene glycol di-o-bromobenzoate, 1,3-pentylene glycol di-p-methylbenzoate, 1,3-pentylene glycol di-p-tert-butylbenzoate, 1,3-pentylene glycol di-p-butylbenzoate, 1,3-pentylene glycol monobenzoate monocinnamate, 1,3-pentylene glycol dicinnamate, 1,3-pentylene glycol dipropionate, 2-methyl-1,3-pentylene glycol monobenzoate monocinnamate, 2,2-dimethyl-1,3-pentylene glycol dibenzoate, 2,2-dimethyl-1,3-pentylene glycol monobenzoate monocinnamate, 2-ethyl-1,3-pentylene glycol dibenzoate, 2-butyl-1,3-pentylene glycol dibenzoate, 2-allyl-1,3-pentylene glycol dibenzoate, 2-methyl-1,3-pentylene glycol monobenzoate monocinnamate, 2,2,4-trimethyl-1,3-pentylene glycol diisopropylformate, 1-trifluoromethyl-3-methyl-2,4-pentylene glycol dibenzoate, 2,4-pentylene glycol di-p-fluoromethylbenzoate, 2,4-pentylene glycol di-2-furancarboxylate, 2-methyl-6-ene-2,4-heptylene glycol dibenzoate, 3-methyl-6-ene-2,4-heptylene glycol dibenzoate, 4-methyl-6-ene-2,4-heptylene glycol dibenzoate, 5-methyl-6-ene-2,4-heptylene glycol dibenzoate, 6-methyl-6-ene-2,4-heptylene glycol dibenzoate, 3-ethyl-6-ene-2,4-heptylene glycol dibenzoate, 4-ethyl-6-ene-2,4-heptylene glycol dibenzoate, 5-ethyl-6-ene-2,4-heptylene glycol dibenzoate, 6-ethyl-6-ene-2,4-heptylene glycol dibenzoate, 3-propyl-6-ene-2,4-heptylene glycol dibenzoate, 4-propyl-6-ene-2,4-heptylene glycol dibenzoate, 5-propyl-6-ene-2,4-heptylene glycol dibenzoate, 6-propyl-6-ene-2,4-heptylene glycol dibenzoate, 3-butyl-6-ene-2,4-heptylene glycol dibenzoate, 4-butyl-6-ene-2,4-heptylene glycol dibenzoate, 5-butyl-6-ene-2,4-heptylene glycol dibenzoate, 6-butyl-6-ene-2,4-heptylene glycol dibenzoate, 3,5-dimethyl-6-ene-2,4-heptylene glycol dibenzoate, 3,5-diethyl-6-ene-2,4-heptylene glycol dibenzoate, 3,5-dipropyl-6-ene-2,4-heptylene glycol dibenzoate, 3,5-dibutyl-6-ene-2,4-heptylene glycol dibenzoate, 3,3-dimethyl-6-ene-2,4-heptylene glycol dibenzoate, 3,3-diethyl-6-ene-2,4-heptylene glycol dibenzoate, 3,3-dipropyl-6-ene-2,4-heptylene glycol dibenzoate, 3,3-dibutyl-6-ene-2,4-heptylene glycol dibenzoate, 3-ethyl-3,5-heptylene glycol dibenzoate, 4-ethyl-3,5-heptylene glycol dibenzoate, 5-ethyl-3,5-heptylene glycol dibenzoate, 3-propyl-3,5-heptylene glycol dibenzoate, 4-propyl-3,5-heptylene glycol dibenzoate, 3-butyl-3,5-heptylene glycol dibenzoate, 2,3-dimethyl-3,5-heptylene glycol dibenzoate, 2,4-dimethyl-3,5-heptylene glycol dibenzoate, 2,5-di methyl-3,5-heptylene glycol dibenzoate, 2,6-dimethyl-3,5-heptylene glycol dibenzoate, 3,3-dimethyl-3,5-heptylene glycol dibenzoate, 4,4-dimethyl-3,5-heptylene glycol dibenzoate, 4,5-dimethyl-3,5-heptylene glycol dibenzoate, 4,6-dimethyl-3,5-heptylene glycol dibenzoate, 4,4-dimethyl-3,5-heptylene glycol dibenzoate, 6,6-dimethyl-3,5-heptylene glycol dibenzoate, 3-ethyl-2-methyl-3,5-heptylene glycol dibenzoate, 4-ethyl-2-methyl-3,5-heptylene glycol dibenzoate, 5-ethyl-2-methyl-3,5-heptylene glycol dibenzoate, 3-ethyl-3-methyl-3,5-heptylene glycol dibenzoate, 4-ethyl-3-methyl-3,5-heptylene glycol dibenzoate, 5-ethyl-3-methyl-3,5-heptylene glycol dibenzoate, 3-ethyl-4-methyl-3,5-heptylene glycol dibenzoate, 4-ethyl-4-methyl-3,5-heptylene glycol dibenzoate, 9,9-bis(benzoyloxymethyl)fluorene, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnoyloxymethyl)fluorene, 9-(benzoyloxymethyl)-9-(propionyloxymethyl)fluorene, 9,9-bis(propionyloxymethyl)fluorene, 9,9-bis(acryloyloxymethyl)fluorene, and 9,9-bis(pivalyloxymethyl)fluorene.

Such esters of diol are disclosed in Chinese patent application Nos. CN1453298A and CN1436796A, relevant contents of which are incorporated herein by reference.

Preferably, the diether compound is chosen from 1,3-diether compounds represented by formula (V):

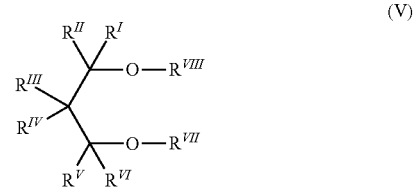

(V)

wherein $R^I$, $R^{II}$, $R^{III}$, $R^{IV}$, $R^V$ and $R^{VI}$, which are the same or different, are independently chosen from hydrogen, halogen, linear and branched $C_1$-$C_{20}$ alkyl, $C_3$-$C_{20}$ cycloalkyl, $C_6$-$C_{20}$ aryl, and $C_7$-$C_{20}$ aralkyl, and two of $R^I$ to $R^{VI}$ are optionally linked to form a ring; $R^{VII}$ and $R^{VIII}$, which are the same or different, are independently chosen from linear and branched $C_1$-$C_{20}$ alkyl, $C_3$-$C_{20}$ cycloalkyl, $C_6$-$C_{20}$ aryl, $C_7$-$C_{20}$ alkaryl and $C_7$-$C_{20}$ aralkyl.

Preferably, the diether compound is chosen from 2-(2-ethylhexyl)-1,3-dimethoxypropane, 2-isopropyl-1,3-dimethoxypropane, 2-butyl-1,3-dimethoxypropane, 2-secbutyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-p-chlorophenyl-1,3-dimethoxypropane, 2-diphenylmethyl-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-ethyl-2-methyl-1,3-dimethoxypropane, 2-methyl-2-isopropyl-1,3-dimethoxypropane, 2-methyl-2-phenyl-1,3-dimethoxypropane, 2-cyclohexyl-2-methyl-1,3-dimethoxypropane, 2,2-bis(2-cyclohexylethyl)-1,3-dimethoxypropane, 2-isobutyl-2-methyl-1,3-dimethoxypropane, 2-(2-ethylhexyl)-2-methyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopentyl-2-isopropyl-1,3-dimethoxypropane, 2-phenyl-2-isopropyl-1,3-dimethoxypropane, 2-sec-butyl-2-phenyl-1,3-dimethoxypropane, 2-benzyl-2-isopropyl-1,3-dimethoxypropane, 2-cyclopentyl-2-isopropyl-1,3-dimethoxypropane, 2-sec-butyl-2-cyclopentyl-1,3-dimethoxypropane, 2-cyclohexyl-2-isopropyl-1,3-dimethoxypropane, 2-sec-butyl-2-cyclohexyl-1,3-dimethoxypropane, 2-sec-butyl-2-isopropyl-1,3-dimethoxypropane, and 2-cyclohexyl-2-cyclohexylmethyl-1,3-dimethoxypropane.

In a fourth aspect, the present invention provides a method for preparing a catalyst component, which method comprises the steps of:

(1) providing the above-described solid composition according to the invention; and (2) contacting and reacting the spherical carrier or solid composition with a titanium compound in the presence or absence of an inert solvent, and optionally adding at least one internal electron donor at one or more stages before, during and/or after the reaction.

The titanium compound and the internal electron donor are as described above for the third aspect. The inert solvent may be chosen from aliphatic hydrocarbons and aromatic hydrocarbons, for example, hexanes, heptanes, octanes, decanes, and toluene.

In some specific embodiments, the method for preparing a catalyst component comprises the steps of:

(1) preparing a solid composition by a process comprising:

(a) reacting a magnesium halide of formula MgX$_2$ with an alcohol of formula R$_1$OH in the presence of at least one polymeric dispersion stabilizer at 30 to 160° C., to form a magnesium halide-alcohol adduct solution; and (b) reacting the magnesium halide-alcohol adduct solution with an epoxide represented by formula (2):

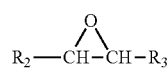
(2)

at 30 to 160° C., to form the solid composition, wherein, X is halogen; R$_1$ is a C$_1$-C$_{12}$ linear or branched alkyl; R$_2$ and R$_3$ are identical or different, and are independently hydrogen or unsubstituted or halogen-substituted C$_1$-C$_5$ linear or branched alkyl, and wherein, relative to one mole of the magnesium halide, the amount of the alcohol used ranges from 3 to 30 moles and the amount of the epoxide represented by the formula (2) used ranges from 1 to 10 moles; and the polymeric dispersion stabilizer is used in an amount of from 0.1 to 10 wt %, based on the total weight of the magnesium halide and the alcohol; and (2) contacting and reacting the solid composition from step (1) with a titanium compound in the presence or absence of an inert solvent, and optionally adding at least one internal electron donor at one or more stages before, during and/or after the reaction.

The details and preferences with respect to the preparation process of the solid composition, the used raw materials and amounts thereof, and the used conditions are as described above for the first aspect.

In some embodiments, the step (2) of the present method for preparing a catalyst component is performed as follows: the solid composition is suspended in a titanium compound feed at −30° C. to 0° C., and then the suspension is heated to a temperature of 40 to 130° C. and allowed to react for 0.1 to 5 hours. More preferably, the step (2) is performed as follows: the solid composition is suspended in a titanium compound feed at −20° C. to 0° C., and then the suspension is heated to a temperature of 50 to 130° C. and allowed to react for 0.5 to 2 hours. The titanium compound feed may be the pure titanium compound or a mixture of the titanium compound and the inert solvent.

In some embodiments, in order that a propylene polymerization using the catalyst component may give rise to olefin polymers having a high isotacticity, it is preferred that step (2) comprises adding the at least one internal electron donor at one or more stages before, during and/or after the reaction of the solid composition with the titanium compound. More preferably, the at least one internal electron donor is introduced in the course of heating the mixture of the solid composition and the titanium compound.

In some preferred embodiments, the method for preparing a catalyst component further comprises: after reacting the solid composition with the titanium compound, filtering off liquid and recovering solids, and then washing the recovered solids with a liquid titanium compound (for example, titanium tetrachloride) one or more times, and preferably 2 to 4 times, then with a hydrocarbon solvent multiple times, to afford the solid catalyst component. The hydrocarbon solvent may be chosen from aliphatic hydrocarbons, aromatic hydrocarbons and alicyclic hydrocarbons, for example, hexanes, heptanes, octanes, decanes, toluene, and the like.

In a preferred embodiment, in order to effectively reduce the break of a catalyst comprising said catalyst component, the step (2) of the method for preparing a catalyst component is performed as follows: the solid composition is brought into contact and reaction with at least one alkoxy titanium in the presence of a hydrocarbon solvent, the resultant intermediate reaction product is brought into contact and reaction with titanium tetrachloride and the internal electron donor compound, and then the resultant reaction product is washed with a hydrocarbon solvent. The alkoxy titanium may be represented by a general formula: Ti(OR$_4$)$_{4-a}$X$_a$, wherein R$_4$ is a C$_1$-C$_{14}$ aliphatic hydrocarbyl, X is halogen, and a is an integer ranging from 0 to 3. Preferably, the alkoxy titanium is chosen from tetrabutoxy titanium, tetraethoxy titanium, tributoxy titanium chloride, dibutoxy titanium dichloride, butoxy titanium trichloride, tri ethoxy titanium chloride, diethoxy titanium dichloride, and ethoxy titanium trichloride, with tetraethoxy titanium and/or tetrabutoxy titanium being the most preferred. The hydrocarbon solvent may be an aliphatic hydrocarbon, an aromatic hydrocarbon, or an alicyclic hydrocarbon, for example, hexane, heptane, octane, decane, toluene, or the like. The alkoxy titanium may be used in an amount of from 0.05 to 1.5 moles, and preferably from 0.1 to 1.2 moles, relative to one mole of magnesium in the solid composition.

In some embodiments, in the step (2) of the method for preparing a catalyst component, relative to one mole of magnesium in the solid composition, the amount of the titanium compound used may range from 5 to 200 moles, and preferably from 10 to 100 moles, and the amount of the internal electron donor used may range from 0 to 0.5 moles, and preferably from 0.08 to 0.4 moles. When the step (2) is performed according to the previous preferred embodiment, the amount of the titanium compound used is intended to mean the total amount of the alkoxy titanium and titanium tetrachloride.

In a fifth aspect, the present invention provides a catalyst for olefin polymerization comprising:

(i) the catalyst component according to the present invention;

(ii) at least one alkyl aluminum compound; and (iii) optionally, at least one external electron donor.

The alkyl aluminum compound may be any of alkyl aluminum compounds commonly used in the art, for example, those represented by a general formula $AlR'_3$, wherein R's are independently halogen or unsubstituted or halogen-substituted $C_1$-$C_8$ alkyl, with the proviso that at least one R' is not halogen. Examples of $C_1$-$C_8$ alkyl include, but are not limited to, methyl, ethyl, propyl, n-butyl, isobutyl, pentyl, hexyl, n-heptyl, and n-octyl. The halogen may be fluorine, chlorine, bromine, or iodine. Particularly, the alkyl aluminum compound may be, for example, one or more chosen from triethyl aluminum, triisobutyl aluminum, tri-n-butyl aluminum, tri-n-hexyl aluminum, diethyl aluminum chloride, diisobutyl aluminum chloride, di-n-butyl aluminum chloride, di-n-hexyl aluminum chloride, ethyl aluminum dichloride, isobutyl aluminum dichloride, n-butyl aluminum dichloride and n-hexyl aluminum dichloride.

The external electron donor may be any of external electron donors commonly used in the art. For example, the external electron donor may be chosen from carboxylic acids, carboxylic anhydrides, carboxylic esters, ketones, ethers, alcohols, lactones, organophosphorus compounds and organic silicon compounds. Preferably, the external electron donor is a silicon compound of general formula: $(R_{17})_x(R_{18})_ySi(OR_{19})_z$, wherein $R_{17}$, $R_{18}$ and $R_{19}$ are independently a $C_1$-$C_{18}$ hydrocarbyl optionally comprising a heteroatom, x and y are each independently an integer of from 0 to 2, z is an integer of from 1 to 3, and the sum of x, y and z is 4. Preferably, $R_{17}$ and $R_{18}$ are independently a $C_3$-$C_{10}$ alkyl or cycloalkyl, optionally comprising a heteroatom; $R_{19}$ is a $C_1$-$C_{10}$ alkyl optionally comprising a heteroatom. Particularly, the external electron donor may be, for example, chosen from cyclohexyl methyl dimethoxy silane, diisopropyl dimethoxy silane, di-n-butyl dimethoxy silane, di-iso-butyl dimethoxy silane, diphenyl dimethoxy silane, methyl tert-butyl dimethoxy silane, dicyclopentyl dimethoxy silane, 2-ethylpiperidino tert-butyl dimethoxy silane, 1,1,1-trifluoro-2-propyl 2-ethylpiperidino dimethoxy silane and 1,1,1-trifluoro-2-propyl methyl dimethoxy silane.

In general, in the catalyst for olefin polymerization, a molar ratio of the catalyst component for olefin polymerization in terms of titanium to the alkyl aluminum in terms of aluminum may range from 1:1 to 1:1,000, preferably from 1:20 to 1:500, and a molar ratio of the external electron donor to the alkyl aluminum in terms of aluminum may range from 1:2 to 1:200, preferably from 1:2.5 to 1:100.

According to the present invention, in the preparation of the catalyst for olefin polymerization, the alkyl aluminum and the optional external electron donor compound may be separately mixed with the catalyst component for olefin polymerization and then allowed to react, or the alkyl aluminum and the optional external electron donor may be first mixed together and then combined and reacted with the catalyst component for olefin polymerization.

According to the present invention, when the catalyst for olefin polymerization is used in an olefin polymerization, the catalyst component for olefin polymerization, the alkyl aluminum, and the optional external electron donor may be added into a polymerization reactor, separately or after having been mixed together. Alternatively, the catalyst for olefin polymerization may be subjected to an olefin prepolymerization through a prepolymerization process well known in the art and then added into a polymerization reactor.

In a sixth aspect, the invention provides use of the above-described catalyst in olefin polymerization.

The improvement of the invention resides in that a novel catalyst for olefin polymerization is utilized, while the specific kinds of the olefin to be polymerized as well as the processes and conditions of the olefin polymerization are the same as known in the prior art.

According to the present invention, the above-described catalyst is especially suitable for the homopolymerization and copolymerization of olefins of general formula $CH_2$=$CHR$, wherein R is hydrogen, $C_1$-$C_6$ alkyl or $C_6$-$C_{12}$ aryl.

According to the present invention, the polymerization of olefin(s) may be carried out according to the known processes. Specifically, the polymerization of olefin(s) may be carried out in liquid phase of monomer(s) or monomer-containing inert solvent, or in gas phase, or in a combination of gas phase and liquid phase, under inert atmosphere. The polymerization temperature is generally in a range of from 0° C. to 150° C., and preferably from 60° C. to 90° C., and the polymerization pressure may be normal pressure or higher, for example, in a range of from 0.01 to 10 MPa (gauge), preferably from 0.01 to 2 MPa (gauge), and more preferably from 0.1 to 2 MPa (gauge). In the polymerization, hydrogen as a regulator of polymer molecular weight may be added to the reaction system to adjust the molecular weight and melt index of a polymer. In addition, the inert gas and solvent used in the olefin polymerization as well as their amounts are well known by a person skilled in the art, and thus this specification does not further describe them.

Thus, according to this aspect of the invention, the present invention further provides a method for olefin polymerization, comprising contacting an olefin of formula $CH_2$=$CHR$, wherein R is hydrogen, $C_1$-$C_6$ alkyl or $C_6$-$C_{12}$ aryl, and optionally a comonomer with the catalyst of the invention under polymerization conditions, to form an olefin polymer; and recovering the resultant olefin polymer.

In a preferred embodiment, the olefin polymerization is homopolymerization of propylene or copolymerization of propylene and a comonomer. Examples of the comonomer copolymerizable with propylene include ethylene, $C_{4-12}$ α-olefins and $C_{4-20}$ diolefins.

EXAMPLES

The following examples are provided to further illustrate the present invention and by no means intend to limit the scope thereof.

Testing methods:

1. Composition of spherical carrier/solid composition: the spherical carrier was dissolved in tri-n-butyl phosphate and deuterotoluene, and $^1$H-NMR spectrum was acquired on a nuclear magnetic resonance spectrometer.

2. Melt index of polymer: measured according to ASTM D1238-99.

3. Isotacticity of polymer: measured by heptane extraction method carried out as follows: 2 g of dry polymer sample was extracted with boiling heptane in an extractor for 6 hours, then the residual substance was dried to constant weight, and the ratio of the weight of the residual polymer (g) to 2 (g) was regarded as isotacticity.

4. Particle size distribution: average particle size and particle size distribution of the spherical carrier/solid composition particles were measured on Masters Sizer Model 2000 (manufactured by Malvern Instruments Co., Ltd.), with the particle size distribution value being defined as SPAN= (D90−D10)/D50.

Examples 1 to 22

There examples are used to illustrate the spherical carrier/solid composition according to the invention and the preparation thereof.

Figure 2:
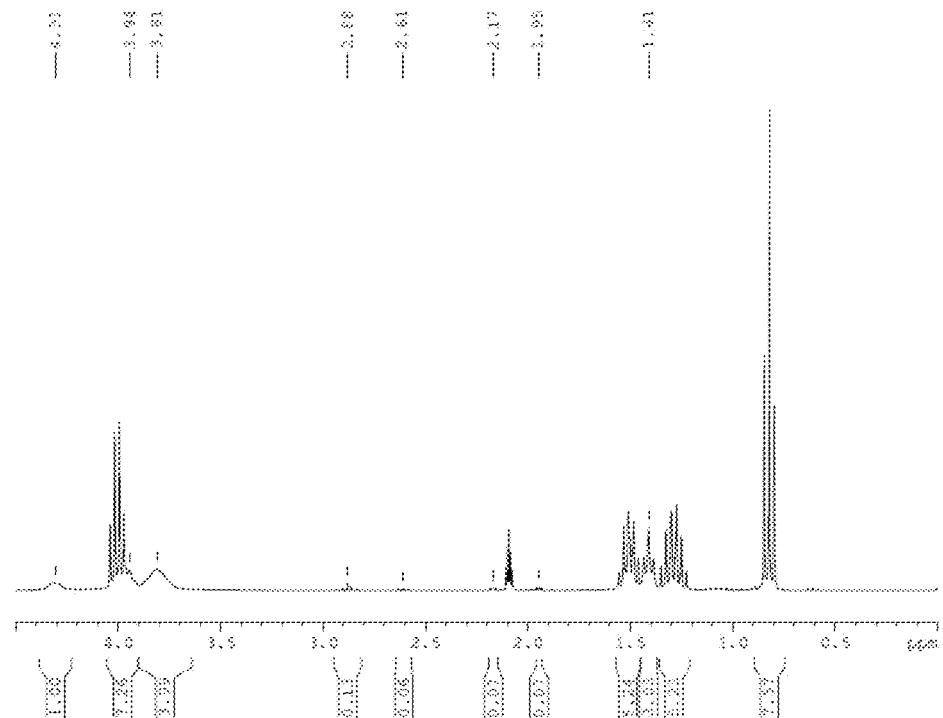
FIG. 2 shows a $^1$H-NMR spectrum of the spherical carrier prepared in Example 2.
Figure 3:
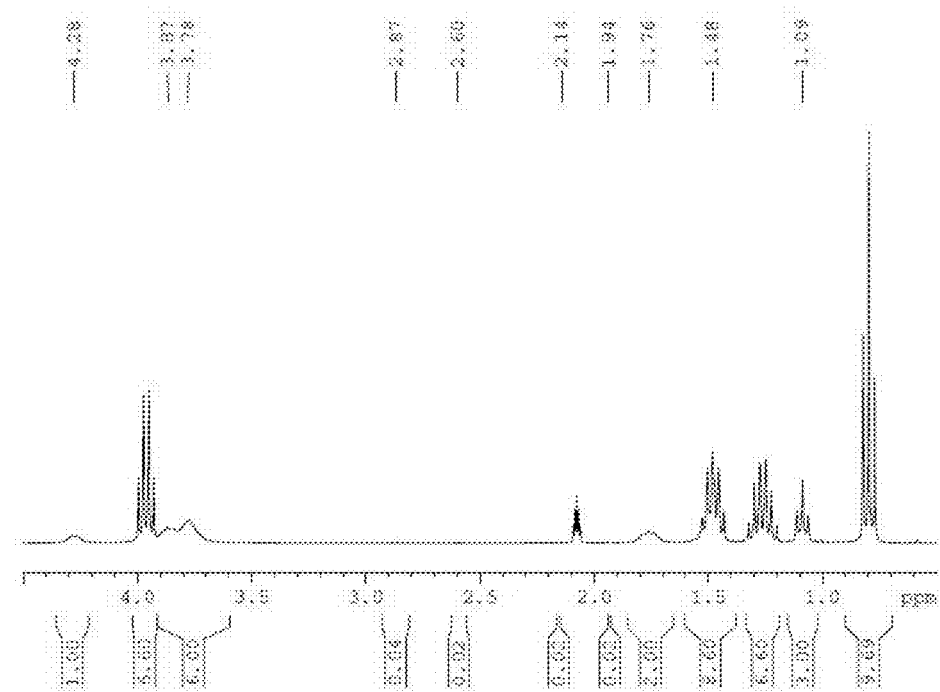
FIG. 3 shows a $^1$H-NMR spectrum of the spherical carrier prepared in Example 13.
Figure 4:
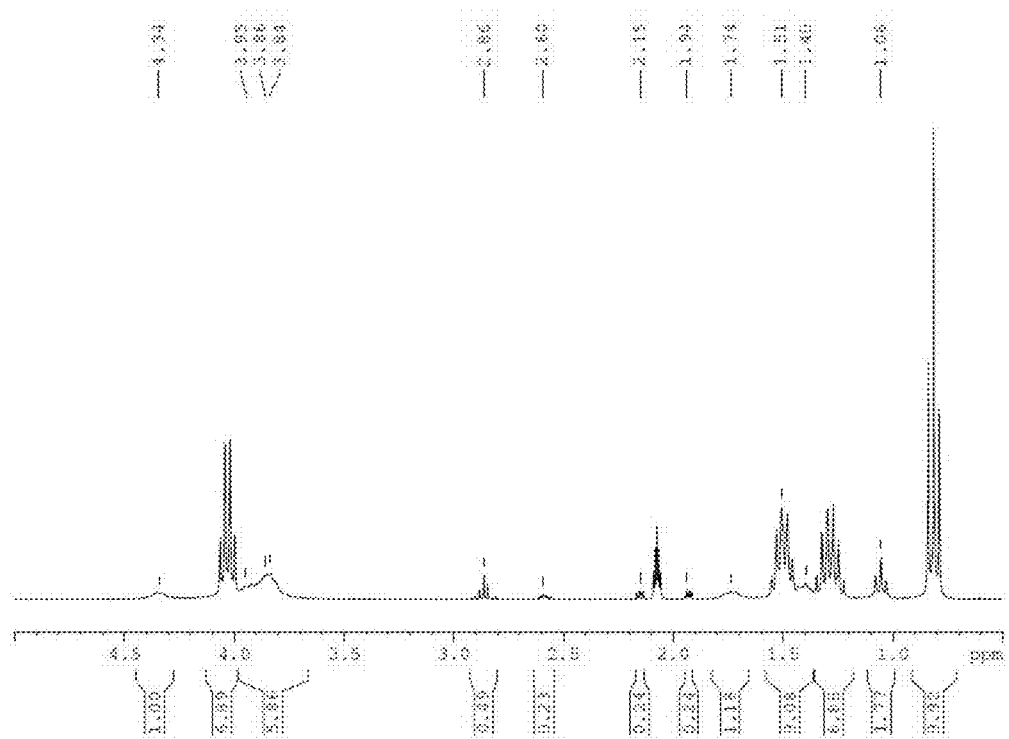
FIG. 4 shows a $^1$H-NMR spectrum of the spherical carrier prepared in Example 16.

To a 500 mL reactor were charged successively with magnesium chloride, an alcohol ($R_1OH$) and a polymeric dispersion stabilizer, and in Examples 19 to 22, toluene as an inert dispersion medium was also added to the reactor in such an amount that a volume ratio of the added toluene to the alcohol was 1:10 for Example 19, 1:3 for Example 20, 1:1 for Example 21, and 1:2 for Example 22. Then, the contents were heated to the reaction temperature (T) with stirring and allowed to react at that temperature for 1 hour. Next, an epoxide (E) was added thereto, and the reaction was continued at that temperature for 0.5 hours. The liquid was filtered off, and the residual solids were washed with hexane 5 times and then dried under vacuum, to afford a particulate spherical carrier. Spherical carriers A1 to A22 were prepared by using the preparation conditions shown in Table 1 below, respectively, and their average particle size (D50) and particle size distribution value (SPAN) are shown in Table 1. A $^1$H-NMR spectrum of the spherical carrier A1 is shown in FIG. 1, a $^1$H-NMR spectrum of the spherical carrier A2 is shown in FIG. 2, a $^1$H-NMR spectrum of the spherical carrier A13 is shown in FIG. 3, a $^1$H-NMR spectrum of the spherical carrier A16 is shown in FIG. 4, and an optical microphotograph of the spherical carrier A1 is shown in FIG. 5.

TABLE 1

| Example No. | T °C. | $R_1(OH)$ | E | $R_1(OH)/MgCl_2$ mol/mol | $E/MgCl_2$ mol/mol | Stabilizer and amount (wt %) | | D50 μm | Span |
|---|---|---|---|---|---|---|---|---|---|
| 1 | 80 | Ethanol | Epoxy chloropropane | 14 | 3 | PVP(Mw = 10000) | 1.6 | 59.0 | 0.64 |
| 2 | 80 | Ethanol | Epoxy chloropropane | 15 | 3 | PVP(Mw = 10000) | 1.4 | 62.3 | 0.65 |
| 3 | 50 | Ethanol | Epoxy chloropropane | 18 | 3 | PVP(Mw = 10000) | 1.0 | 61.7 | 0.69 |
| 4 | 50 | Ethanol | Epoxy chloropropane | 20 | 3 | PVP(Mw = 8000) | 0.5 | 82.3 | 0.70 |
| 5 | 70 | Ethanol | Epoxy chloropropane | 15 | 3 | PVP(Mw = 10000) | 1.4 | 53.9 | 0.68 |
| 6 | 90 | Ethanol | Epoxy chloropropane | 14 | 3 | PVP(Mw = 10000) | 1.2 | 70.3 | 0.68 |
| 7 | 80 | Ethanol | Epoxy chloropropane | 14 | 2 | PVP(Mw = 10000) | 1.6 | 72.3 | 0.69 |
| 8 | 80 | Ethanol | Epoxy chloropropane | 14 | 2 | PVP(Mw = 10000) | 3.2 | 65.7 | 0.84 |
| 9 | 80 | Ethanol | Epoxy propane | 14 | 4 | PVP(Mw = 10000) | 1.4 | 56.3 | 0.74 |
| 10 | 80 | Ethanol | Epoxy chloropropane | 15 | 3 | PVP(Mw = 10000) | 1.8 | 45.5 | 0.69 |
| 11 | 80 | Ethanol | Epoxy chloropropane | 15 | 3 | PVP(Mw = 58000) | 1.5 | 61.5 | 0.82 |
| 12 | 80 | Ethanol | Epoxy chloropropoxypane | 15 | 3 | PVP(Mw = 130 × 10$^4$) | 1.5 | 57.8 | 2.4 |
| 13 | 90 | Butanol | Epoxy chloropropane | 12 | 3 | PVP(Mw = 10000) | 1.5 | 34.7 | 0.65 |
| 14 | 100 | Butanol | Epoxy chloropropane | 12 | 3 | PVP(Mw = 10000) | 1.5 | 42.3 | 0.68 |
| 15 | 90 | Ethanol + Butanol | Epoxy chloropropane | 1 + 11 | 3 | PVP(Mw = 10000) | 1.5 | 56.3 | 0.72 |
| 16 | 90 | Ethanol + Butanol | Epoxy chloropropane | 6 + 6 | 3 | PVP(Mw = 10000) | 1.5 | 53.8 | 0.78 |
| 17 | 90 | Ethanol + isooctanol | Epoxy chloropropane | 2 + 2 | 2 | PVP(Mw = 10000) | 1.5 | 33.3 | 1.0 |
| 18 | 80 | Ethanol | Epoxy chloropropane | 15 | 3 | PEG(Mw = 6000) | 1.5 | 120.4 | 1.5 |
| 19 | 80 | Ethanol | Epoxy chloropropane | 15 | 3 | PVP(Mw = 10000) | 1.7 | 71.3 | 0.71 |
| 20 | 80 | Ethanol | Epoxy chloropropane | 10 | 3 | PVP(Mw = 10000) | 2.3 | 56.5 | 0.68 |
| 21 | 90 | Ethanol | Epoxy chloropropane | 8 | 3 | PVP(Mw = 10000) | 3.5 | 65.7 | 0.65 |
| 22 | 80 | Ethanol | Epoxy chloropropane | 10 | 3 | PVP(Mw = 10000) | 2.3 | 85.7 | 1.0 |

Figure 5:
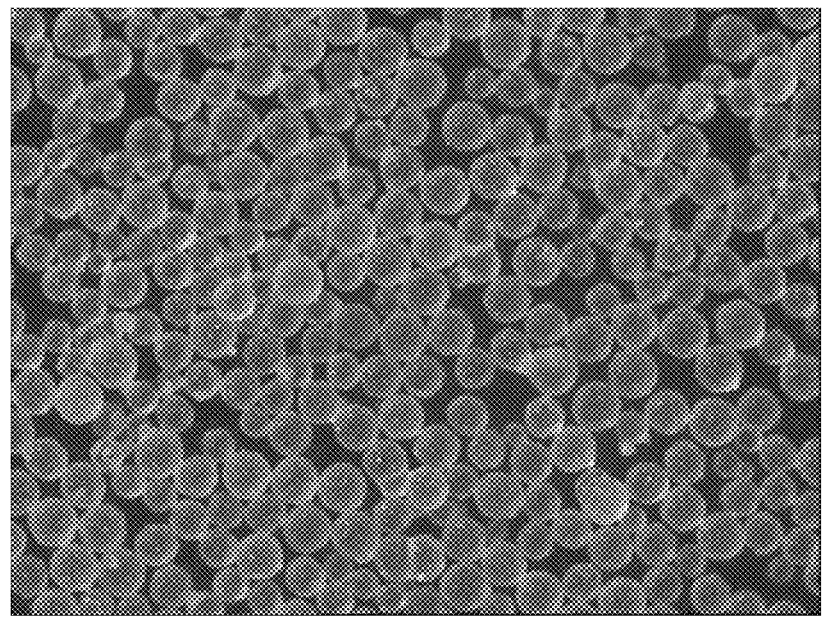
FIG. 5 is an optical microphotograph of the spherical carrier prepared in Example 1.

It can be seen from Table 1 and FIG. 5 that the particles of the spherical carriers prepared by the inventive method are of substantively spherical shape and have a relatively narrow particle size distribution.

The assignment and integral area of each peak in the $^1$H-NMR spectrum of the spherical carrier A1 are shown in Table 2 below.

TABLE 2

| Assigned group | Chemical shift, ppm | Integral area |
| --- | --- | --- |
| $CH_3(V)$ | 1.40 | 3.01 |
| $CH_2(V)$ | 3.93 | 7.10 − 5.10 = 2 |
| $CH(V)$ | 4.29 | 1.00 |
| $CH_2Cl(V)$ | 3.79 | 4.00 |
| $CH_2Cl(VI)$ | 2.87 | 0.08 |
| C—CH—C(VI) | 2.60 | 0.04 |
| C—CH—O(VI) | 2.16 | 0.04 |
| C—CH—O(VI) | 1.95 | 0.04 |

Notation: The peak in FIG. 1 that is not assigned to a group is the solvent peak.

Thus, it can be known that the spherical carrier A1 consists mainly of the compound of formula (V) and the compound of formula (VI), with the molar ratio of the compound of the formula (V) to the compound of the formula (VI) being 1:0.04.

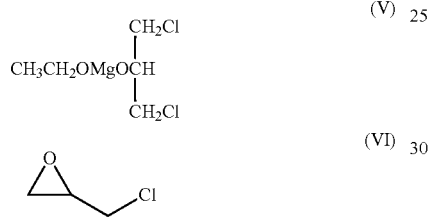

(V)

(VI)

The spherical carrier A1 further comprises a trace amount of PVP, and this is verified by its IR spectrum.

The assignment and integral area of each peak in the $^1$H-NMR spectrum of the spherical carrier A2 are shown in Table 3 below.

TABLE 3

| Assigned group | Chemical shift, ppm | Integral area |
| --- | --- | --- |
| $CH_3(V)$ | 1.41 | 3.03 |
| $CH_2(V)$ | 3.94 | 7.26 − 5.23 = 2.03 |
| $CH(V)$ | 4.31 | 1.00 |
| $CH_2Cl(V)$ | 3.81 | 3.99 |
| $CH_2Cl(VI)$ | 2.88 | 0.13 |
| C—CH—C(VI) | 2.61 | 0.06 |
| C—CH—O(VI) | 2.17 | 0.07 |
| C—CH—O(VI) | 1.95 | 0.07 |

Notation: The peak in FIG. 2 that is not assigned to a group is the solvent peak.

Thus, it can be known that the spherical carrier A2 consists mainly of the compound of the formula (V) and the compound of the formula (VI), with the molar ratio of the compound of the formula (V) to the compound of the formula (VI) being 1:0.07.

The assignment and integral area of each peak in the $^1$H-NMR spectrum of the spherical carrier A13 are shown in Table 4 below.

TABLE 4

| Assigned group | Chemical shift, ppm | Integral area |
| --- | --- | --- |
| $CH_3(VII)$ | 1.09 | 3.00 |
| $CH_2(VII)$ | 3.87 | 2.00 |

TABLE 4-continued

| Assigned group | Chemical shift, ppm | Integral area |
| --- | --- | --- |
| $CH_2(VII)$ | 1.76 | 2.00 |
| $CH_2(VII)$ | 1.48 | 8.60 − 6.60 = 2.00 |
| $CH(VII)$ | 4.28 | 1.00 |
| $CH_2Cl(VII)$ | 3.78 | 6.00 − 2.00 = 4.00 |
| $CH_2Cl(VI)$ | 2.87 | 0.04 |
| C—CH—C(VI) | 2.60 | 0.02 |
| C—CH—O(VI) | 2.14 | 0.02 |
| C—CH—O(VI) | 1.94 | 0.02 |

Notation: The peak in FIG. 3 that is not assigned to a group is the solvent peak.

Thus, it can be known that the spherical carrier A13 consists mainly of the compound of formula (VII) and the compound of the formula (VI), with the molar ratio of the compound of the formula (VII) to the compound of the formula (VI) being 1:0.02.

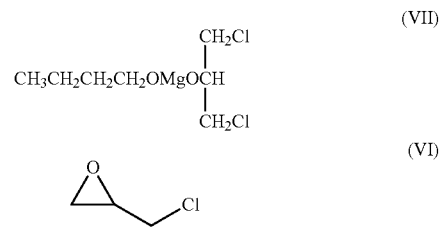

(VII)

(VI)

The assignment and integral area of each peak in the $^1$H-NMR spectrum of the spherical carrier A16 are shown in Table 5 below.

TABLE 5

| Assigned group | Chemical shift, ppm | Integral area |
| --- | --- | --- |
| $CH_3(V)$ | 1.40 | 9.08 − 6.88 − 1.18 = 1.02 |
| $CH_2(V)$ | 3.95 | 5.86 − 4 − 1.18 = 0.68 |
| $CH_3(VII)$ | 1.06 | 1.77 |
| $CH_2(VII)$ | 3.86 | 1.18 |
| $CH_2(VII)$ | 1.74 | 1.18 |
| $CH_2(VII)$ | 1.51 | 1.18 |
| $CH(VII)$ | 4.34 | 1.00 |
| $CH_2Cl(VII)$ | 3.84 | 4.00 |
| $CH_2Cl(VI)$ | 2.86 | 0.49 |
| C—CH—C(VI) | 2.60 | 0.23 |
| C—CH—O(VI) | 2.15 | 0.24 |
| C—CH—O(VI) | 1.94 | 0.24 |

Notation: The peak in FIG. 4 that is not assigned to a group is the solvent peak.

Thus, it can be known that the spherical carrier A16 consists mainly of the compound of the formula (V), the compound of the formula (VI) and the compound of the formula (VII), with the molar ratio of the compound of the formula (VI) to the sum of the compound of the formula (V) and the compound of the formula (VII) is 0.24:1, and the molar ratio of the compound of the formula (VI) to the compound of the formula (VII) is 1:1.74.

Comparative Example 1

To a 500 mL reactor were charged successively with 7.2 g of magnesium chloride, 180 ml of white oil, and 82 ml of ethanol. Then, the contents were heated to 90° C. with stirring and allowed to react at that temperature for 1 hour. Next, 24 ml of epoxy chloropropane was added thereto, and the reaction was continued at that temperature for 0.5 hours. The liquid was filtered off, and the residual solids were washed with hexane 5 times and then dried under vacuum, to afford a spherical carrier D1.

Comparative Example 2

The procedure described in Comparative Example 1 was followed to prepare a spherical carrier, except that the inert dispersion medium, white oil, was omitted. As a result, no solid particles were obtained.

Comparative Example 3

Figure 6:
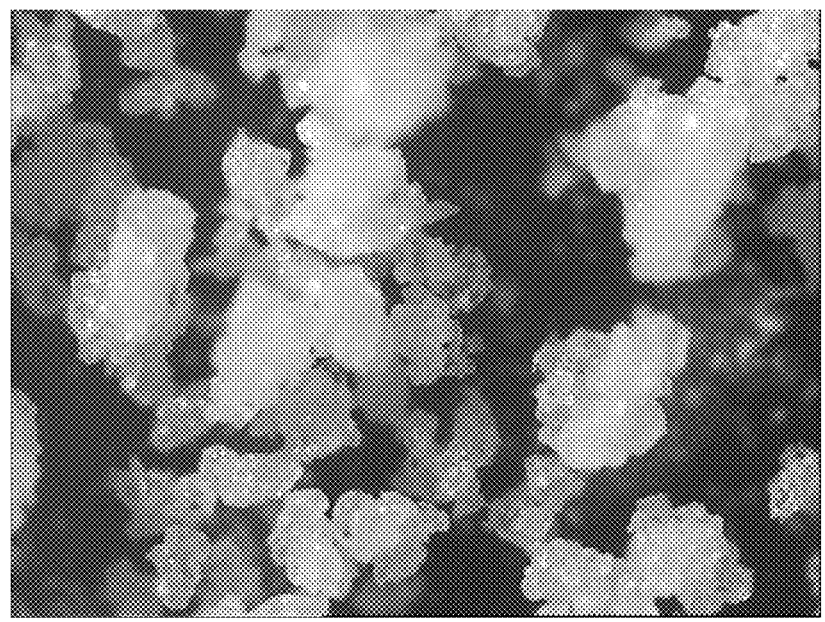
FIG. 6 is an optical microphotograph of the lump carrier prepared in Comparative Example 3.

A carrier was prepared according to the procedure described in Example 1, except that the PVP used in Example 1 was replaced with the same weight of nonionic surfactant Span 80, thereby affording a lump carrier D3. An optical microphotograph of this lump carrier is shown in FIG. 6.

Comparative Example 4

A carrier was prepared according to the procedure described in Example 1, except that the polymeric dispersion stabilizer PVP was omitted, thereby affording a lump carrier D4.

Comparative Example 5

To a 500 mL closed reactor were charged successively with 22 g of magnesium chloride, 188 ml of ethanol, and 2.7 g of PVP (Mw=10,000). Then, the contents were heated to 80° C. with stirring and allowed to react at that temperature for 1 hour. Next, 4 ml of TiCl$_4$ was added drop-wise to the solution, and the reaction was continued at that temperature for 0.5 hours. Then, 57 ml of epoxy chloropropane was added to the solution, and the reaction was continued at that temperature for 0.5 hours. The liquid was filtered off, and only a little amount of amorphous powdery solids was obtained.

The following working examples are provided to illustrate the inventive catalyst component, the preparation thereof, catalyst and its use.

Working Example 1

(1) Preparation of Solid Catalyst Component 100 mL of titanium tetrachloride was added to a 300 mL glass reactor and cooled to −20° C. Then 8 g of the spherical carrier A1 from Example 1 was added to the reactor, and the contents were heated to 110° C., with 1.5 ml of diisobutyl phthalate being added to the reactor during the heating. Then, the liquid was removed through filtration, and the residues were wished with titanium tetrachloride twice and with hexane thrice, and then dried under vacuum to give a solid catalyst component Cat-1.

(2) Liquid Phase Bulk Polymerization of Propylene

A liquid phase bulk polymerization of propylene was conducted in a 5 L stainless steel autoclave as follows: under nitrogen atmosphere, to the autoclave were charged successively with 5 ml solution of triethyl aluminum in hexane (having a concentration of 0.5 mmol/ml), 1 ml solution of cyclohexyl methyl dimethoxy silane (CHMMS) in hexane (having a concentration of 0.1 mmol/ml), and 9 mg of the above-prepared solid catalyst Cat-1. The autoclave was closed, and then a certain amount (standard volume) of hydrogen gas and 2.3 L of liquid propylene were introduced thereto. The contents were heated to 70° C., and polymerization was allowed to continue at 70° C. for 1 hour. The autoclave was cooled, vented, and discharged. The obtained propylene homopolymer was dried and then weighed. The results are shown in Table 6 below.

Working Examples 2 to 12

According to the procedure described in Working Example 1, solid catalyst components were prepared and propylene liquid phase bulk polymerizations were carried out, except that the used spherical carriers, internal electron donors, and amounts of hydrogen gas were as shown in Table 6 below. Polymerization activities as well as isotacticities and melt indexes of the prepared propylene homopolymers are also shown in Table 6.

Comparative Working Example 1

According to the procedure described in Working Example 1, a solid catalyst component was prepared and propylene liquid phase bulk polymerization was carried out, except that the spherical carrier D1 prepared in Comparative Example 1 was used to replace for the spherical carrier A1. The results are shown in Table 6 below.

Working Example 13

(1) Preparation of Catalyst Component

In a 300 mL glass reactor equipped with a mechanical stirrer, under nitrogen atmosphere, 10 g of the spherical carrier A1 was dispersed in 100 mL of hexane, cooled to −10° C., and maintained at that temperature for 0.5 hours. 2.5 ml of tetraethoxy titanium (TET) (TET/Mg molar ratio=0.2) was added thereto, and the temperature was slowly enhanced to 60° C. and maintained for 0.5 hours. Then, the liquid was removed through filtration, and the residues were wished with hexane thrice, and dried under vacuum to give an intermediate product.

Under nitrogen atmosphere, 100 mL of titanium tetrachloride was added into a 300 mL glass reactor equipped with a mechanical stirrer and cooled to −20° C. Then 8 g of the above-prepared intermediate product was added to the reactor, and the contents were heated to 110° C., with 1.5 ml of diisobutyl phthalate being added to the reactor during the heating. After the contents were allowed to react at 110° C. for 0.5 hours, the liquid was removed through filtration, and the residues were wished with titanium tetrachloride twice and with hexane thrice, and then dried under vacuum to give a spherical solid catalyst component Cat-13.

(2) Liquid Phase Bulk Polymerization of Propylene

A liquid phase bulk polymerization of propylene was conducted according to the procedure described in Working Example 1, except that the solid catalyst component Cat-13 was used to replace for the solid catalyst component Cat-1. Polymerization activity as well as isotacticity and melt index of the prepared propylene homopolymer is shown in Table 6.

TABLE 6

| Working Example No. | Spherical carrier | Internal electron donor | Amount of H$_2$ NL | Polymerization Activity KgPP/gCat | Isotactic index of polymer wt % | Melt index of polymer g/10 min |
|---|---|---|---|---|---|---|
| 1 | A1 | DIBP | 1.5 | 37.8 | 98.1 | 6.5 |
|   |    |      | 5.0 | 45.2 | 96.9 | 29.7 |
|   |    |      | 6.5 | 46.8 | 96.6 | 35.1 |
| 2 | A1 | PDB  | 1.5 | 43.8 | 97.1 | 2.3 |
| 3 | A1 | PPDE | 1.5 | 52.1 | 98.3 | 9.5 |

TABLE 6-continued

| Working Example No. | Spherical carrier | Internal electron donor | Amount of $H_2$ NL | Polymerization Activity KgPP/gCat | Isotactic index of polymer wt % | Melt index of polymer g/10 min |
|---|---|---|---|---|---|---|
| 4 | A2 | DIBP | 1.5 | 43.3 | 98.0 | 9.2 |
| 5 | A3 | DIBP | 1.5 | 38.2 | 97.9 | 6.8 |
| 6 | A6 | DIBP | 1.5 | 40.4 | 98.0 | 7.5 |
| 7 | A8 | DIBP | 1.5 | 36.8 | 98.0 | 5.9 |
| 8 | A9 | DIBP | 1.5 | 42.3 | 97.8 | 4.6 |
| 9 | A11 | DIBP | 1.5 | 34.3 | 98.1 | 11.0 |
| 10 | A13 | DIBP | 1.5 | 39.3 | 97.8 | 8.2 |
|  |  |  | 5.0 | 37.5 | 96.8 | 28.8 |
|  |  |  | 6.5 | 39.6 | 96.6 | 32.0 |
| 11 | A16 | DIBP | 1.5 | 42.1 | 98.1 | 8.2 |
| 12 | A20 | DIBP | 1.5 | 37.5 | 98.0 | 5.3 |
| 13 | A1 | DIBP | 1.5 | 42.5 | 97.9 | 7.9 |
| Comp. Working Ex. 1 | D1 | DIBP | 1.5 | 34.5 | 97.3 | 4.8 |

It can be seen from the data in Table 6 that, when the catalyst of the invention is used in propylene polymerization, a high polymerization activity and a high stereo-directing ability can be obtained and, at the same time, the olefin polymerization catalyst of the invention has a good hydrogen response. Particularly, when the catalyst of the invention is used to carry out propylene polymerization, the resulting polymer has a high isotactic index, even when it has a high melt index.

What is claimed is:

1. A method for preparing a spherical carrier of an olefin polymerization catalyst, which method comprises reacting at least the following components: (a) a magnesium halide, (b) an organic compound containing active hydrogen, and (c) an epoxide, in the presence of at least one polymeric dispersion stabilizer, to directly precipitate a solid particulate product, wherein the polymeric dispersion stabilizer is at least one chosen from styrene-maleic anhydride copolymers, polystyrene sulfonates, naphthalenesulfonic acid-formaldehyde condensation products, condensed alkyl phenyl ether sulfates, condensed alkylphenol polyoxyethylene ether phosphates, oxyalkyl acrylate copolymer-modified polyethyleneimines, poly(1-dodecyl-4-vinylpyridinium bromide)s, poly(vinylbenzyl trimethyl ammonium salt)s, poly(vinyl alcohol)s, polyacrylamides, ethylene oxide-propylene oxide block copolymers, polyvinylpyrrolidones, poly(vinylpyrrolidone-co-vinyl acetate)s, poly(ethylene glycol)s, alkylphenyl poly oxyethylene ethers and poly(alkyl methylacrylate)s.

2. The method according to claim 1, wherein the reaction process comprises:
(1) reacting the magnesium halide with the organic compound containing active hydrogen in the presence of the at least one polymeric dispersion stabilizer to form a complex solution; and
(2) reacting the complex solution with the epoxide to directly precipitate the spherical carrier.

3. The method according to claim 2, having at least one of the following features:
in step (1), the amount of the organic compound containing active hydrogen used ranges from 3 to 30 moles, relative to one mole of the magnesium halide, and the amount of the polymeric dispersion stabilizer used ranges from 0.1 to 10 wt %, based on the total weight of the magnesium halide and the organic compound containing active hydrogen;
reaction conditions of step (1) include: a reaction temperature of from 30 to 160° C.; and a reaction time of from 0.1 to 5 hours;
in step (2), the amount of the epoxide used ranges from 1 to 10 moles, relative to one mole of the magnesium halide; and
reaction conditions of step (2) include: a reaction temperature of from 30 to 160° C.; and a reaction time of from 0.1 to 5 hours.

4. The method according to claim 1, having at least one of the following features:
the polymeric dispersion stabilizer has a weight average molecular weight of larger than 1,000;
the magnesium halide is at least one chosen from magnesium dichloride, magnesium dibromide and magnesium diiodide;
the organic compound containing active hydrogen is at least one alcohol of formula $R_1OH$, wherein $R_1$ is a $C_1$-$C_{12}$ linear or branched alkyl; and
no inert dispersion medium is used in both step (1) and (2).

5. The method according to claim 1, wherein the epoxide has a structure formula (2):

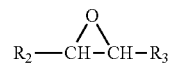

(2)

wherein $R_2$ and $R_3$ are identical or different, and are each independently hydrogen or unsubstituted or halogen-substituted $C_1$-$C_5$ linear or branched alkyl.

6. The method according to claim 1, wherein no titanium tetrachloride is introduced in the course of the reaction of the specified components.

7. A spherical carrier prepared by the method according to claim 1.

8. A process for preparing a solid composition, comprising the steps of:
(a) reacting a magnesium halide of formula $MgX_2$ with an alcohol of formula $R_1OH$ in the presence of at least one polymeric dispersion stabilizer at 30 to 160° C., to form a magnesium halide-alcohol adduct solution; and
(b) reacting the magnesium halide-alcohol adduct solution with an epoxide represented by formula (2):

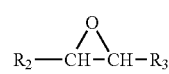

(2)

at 30 to 160° C., to directly precipitate particles of the solid composition,
wherein X is halogen; $R_1$ is a $C_1$-$C_{12}$ linear or branched alky; and $R_2$ and $R_3$ are identical or different, and are each independently hydrogen or unsubstituted or halogen-substituted $C_1$-$C_5$ linear or branched alkyl,
wherein the polymeric dispersion stabilizer is at least one chosen from styrene-maleic anhydride copolymers, polystyrene sulfonates, naphthalenesulfonic acid-formaldehyde condensation products, condensed alkyl phenyl ether sulfates, condensed alkylphenol poly oxyethylene ether phosphates, oxyalkyl acrylate copolymer-modified poly ethyleneimines, poly(1-dodecyl-4-vinylpyridinium bromide)s, poly(vinylbenzyl trimethyl ammonium salt)s, poly(vinyl alcohol)s, polyacrylamides, ethylene oxide-propylene oxide block copolymers, polyvinylpyrrolidones, poly(vinylpyrrolidone-co-vinyl acetate)s, poly(ethylene glycol)s, alkylphenyl polyoxyethylene ethers and poly(alkyl methylacrylate)s, and wherein, relative to one mole of the magnesium halide, the amount of the alcohol used ranges from 3 to 30 moles and the amount of the epoxide represented by the formula (2) used ranges from 1 to 10 moles; and the polymeric dispersion stabilizer is used in an amount of from 0.1 to 10 wt %, based on the total weight of the magnesium halide and the alcohol.

9. The process according to claim 8, having at least one of the following features:

step (a) is carried out in a closed vessel;

$R_1$ is a $C_1$-$C_8$ linear or branched alkyl;

$R_2$ and $R_3$ are independently hydrogen or unsubstituted or halogen-substituted $C_1$-$C_3$ linear or branched alkyl;

relative to one mole of the magnesium halide, the amount of the alcohol used ranges from 4 to 20 moles and the amount of the epoxide represented by the formula (2) used ranges from 2 to 6 moles;

the polymeric dispersion stabilizer is used in an amount of from 0.2 to 5 wt %, based on the total weight of the magnesium halide and the alcohol;

the magnesium halide is at least one chosen from magnesium dichloride, magnesium dibromide and magnesium diiodide;

the alcohol is at least one chosen from methanol, ethanol, propanol, isopropanol, n-butanol, isobutanol, pentanol, isopentanol, n-hexanol, n-octanol, and 2-ethylhexanol;

the epoxide is at least one chosen from epoxy ethane, epoxy propane, epoxy butane, epoxy chloropropane, epoxy chlorobutane, epoxy bromopropane, and epoxy bromobutane;

the polymeric dispersion stabilizer has a weight average molecular weight of larger than 1,000;

and no inert dispersion medium is used in both step (a) and (b).

10. A solid composition prepared by the process according to claim 8.

11. The solid composition according to claim 10, comprising a magnesium compound represented by formula (1) and an epoxide represented by formula (2):

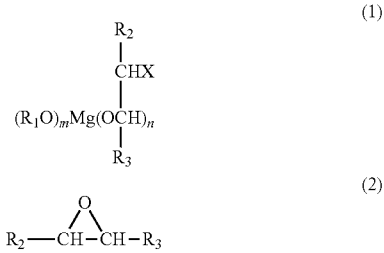

wherein $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2; and wherein the content of the epoxide represented by the formula (2) is in a range of from 0.01 to 0.8 moles per mole of the magnesium compound represented by the formula (1).

12. The solid composition according to claim 11, having at least one of the following features:

$R_1$ is a $C_1$-$C_8$ linear or branched alkyl;

$R_2$ and $R_3$ are independently hydrogen or unsubstituted or halogen-substituted $C_1$-$C_3$ linear or branched alkyl;

X is chlorine;

m is in a range of from 0.5 to 1.5, n is in a range of from 0.5 to 1.5, and m+n=2;

the content of the epoxide represented by the formula (2) is from 0.02 to 0.5 moles, per mole of the magnesium compound represented by the formula (1).

13. A catalyst component for olefin polymerization, comprising reaction products of the following components:

(1) a solid composition, which is the spherical carrier of claim 7 or the solid composition of claim 10;

(2) at least one titanium compound; and (3) optionally, at least one internal electron donor.

14. The catalyst component according to claim 13, wherein the solid composition comprises a magnesium compound represented by formula (1) and an epoxide represented by formula (2),

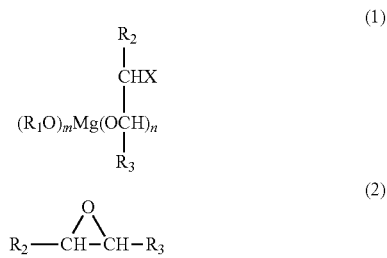

wherein $R_1$ is a $C_1$-$C_{12}$ linear or branched alkyl; $R_2$ and $R_3$ are identical or different, and are independently hydrogen or unsubstituted or halogen-substituted $C_1$-$C_5$ linear or branched alkyl; X is halogen; m is in a range of from 0.1 to 1.9, n is in a range of from 0.1 to 1.9, and m+n=2; and wherein the content of the epoxide represented by the formula (2) is in a range of from 0.01 to 0.8 moles per mole of the magnesium compound represented by the formula (1).

15. The catalyst component according to claim 14, having at least one of the following features:

$R_1$ is a $C_1$-$C_8$ linear or branched alkyl;

$R_2$ and $R_3$ are independently hydrogen or unsubstituted or halogen-substituted $C_1$-$C_3$ linear or branched alkyl;

X is chlorine;

m is in a range of from 0.5 to 1.5, n is in a range of from 0.5 to 1.5, and m+n=2;

the content of the epoxide represented by the formula (2) in the solid composition is from 0.02 to 0.5 moles, per mole of the magnesium compound represented by the formula (1);

relative to one mole of the magnesium compound represented by the formula (1) in the solid composition, the titanium compound is used in an amount of from 5 to 200 moles, and the internal electron donor is used in an amount of from 0 to 0.5 moles; and the titanium compound is chosen from those represented by a formula: $Ti(OR_4)_{4-a}X_a$, wherein $R_4$ is a $C_1$-$C_{14}$ aliphatic hydrocarbyl, X is halogen, and a is an integer ranging from 0 to 4.

16. The catalyst component according to claim 14, the internal electron donor chosen from ethyl benzoate, diethyl phthalate, di-iso-butyl phthalate, di-n-butyl phthalate, di-iso-octyl phthalate, di-n-octyl phthalate, diethyl malonate, dibutyl malonate, diethyl 2,3-di-iso-propylsuccinate, di-iso-butyl 2,3-di-isopropylsuccinate, di-n-butyl 2,3-diisopropylsuccinate, dimethyl 2,3-di-isopropylsuccinate, di-iso-butyl 2,2-dimethylsuccinate, di-iso-butyl 2-ethyl-2-methylsuccinate, diethyl 2-ethyl-2-methylsuccinate, diethyl adipate, dibutyl adipate, diethyl sebacate, dibutyl sebacate, diethyl maleate, di-n-butyl maleate, diethyl naphthalene dicarboxylate, dibutyl naphthalene dicarboxylate, triethyl trimellitate, tributyl trimellitate, triethyl benzene-1,2,3-tricarboxylate, tributyl benzene-1,2,3-tricarboxylate, tetraethyl pyromellitate, tetrabutyl pyromellitate, 1,3-propylene glycol dibenzoate, 2-methyl-1,3-propylene glycol dibenzoate, 2-ethyl-1,3-propylene glycol dibenzoate, 2,2-dimethyl-1,3-propylene glycol dibenzoate, (R)-1-phenyl-1,3-propylene glycol dibenzoate, 1,3-diphenyl-1,3-propylene glycol dibenzoate, 1,3-diphenyl-1,3-propylene glycol dipropionate, 2-methyl-1,3-diphenyl-1,3-propylene glycol dipropionate, 2-methyl-1,3-diphenyl-1,3-propylene glycol diacetate, 2,2-dimethyl-1,3-diphenyl-1,3-propylene glycol dibenzoate, 2,2-dimethyl-1,3-diphenyl-1,3-propylene glycol dipropionate, 1,3-di-tert-butyl-2-ethyl -1,3-propylene glycol dibenzoate, 1,3-diphenyl-1,3-propylene glycol diacetate, 1,3-diisopropyl-1,3-propylene glycol di-4-butylbenzoate, 2-amino-1-phenyl-1,3-propylene glycol dibenzoate, 2-methyl-1-phenyl-1,3-butylene glycol dibenzoate, phenyl-2-methyl-1,3-butylene glycol dipivalate, 3-butyl-2,4-pentylene glycol dibenzoate, 3,3-dimethyl-2,4-pentylene glycol dibenzoate, (2S,4S)-(+)-2,4-pentylene glycol dibenzoate, (2R,4R)-(+)-2,4-pentylene glycol dibenzoate, 2,4-pentylene glycol di-p-chlorobenzoate, 2,4-pentylene glycol di-m-chlorobenzoate, 2,4-pentylene glycol di-p-bromobenzoate, 2,4-pentylene glycol di-o-bromobenzoate, 2,4-pentylene glycol di-p-methylbenzoate, 2,4-pentylene glycol di-p-tert-butylbenzoate, 2,4-pentylene glycol di-p-butylbenzoate, 2-methyl-1,3-pentylene glycol di-p-chlorobenzoate, 2-methyl-1,3-pentylene glycol di-p-methylbenzoate, 2-butyl-1,3-pentylene glycol di-p-methylbenzoate, 2-methyl-1,3-pentylene glycol di-p-tert-butylbenzoate, 2-methyl-1,3-pentylene glycol pivalate, 2-methyl-1,3-pentylene glycol monobenzoate monocinnamate, 2,2-dimethyl-1,3-pentylene glycol dibenzoate, 2,2-dimethyl-1,3-pentylene glycol monobenzoate monocinnamate, 2-ethyl-1,3-pentylene glycol dibenzoate, 2-butyl-1,3-pentylene glycol dibenzoate, 2-allyl-1,3-pentylene glycol dibenzoate, 2-methyl-1,3-pentylene glycol dibenzoate, 2-ethyl-1,3-pentylene glycol dibenzoate, 2-propyl-1,3-pentylene glycol dibenzoate, 2-butyl-1,3-pentylene glycol dibenzoate, 2,2-dimethyl-1,3-pentylene glycol dibenzoate, 1,3-pentylene glycol di-p-chlorobenzoate, 1,3-pentylene glycol di-m-chlorobenzoate, 1,3-pentylene glycol di-p-bromobenzoate, 1,3-pentylene glycol di-o-bromobenzoate, 1,3-pentylene glycol di-p-methylbenzoate, 1,3-pentylene glycol di-p-tert-butylbenzoate, 1,3-pentylene glycol di-p-butylbenzoate, 1,3-pentylene glycol monobenzoate monocinnamate, 1,3-pentylene glycol dicinnamate, 1,3-pentylene glycol dipropionate, 2-methyl-1,3-pentylene glycol monobenzoate monocinnamate, 2,2-dimethyl-1,3-pentylene glycol dibenzoate, 2,2-dimethyl-1,3-pentylene glycol monobenzoate monocinnamate, 2-ethyl-1,3-pentylene glycol dibenzoate, 2-butyl-1,3-pentylene glycol dibenzoate, 2-allyl-1,3-pentylene glycol dibenzoate, 2-methyl-1,3-pentylene glycol monobenzoate monocinnamate, 2,2,4-trimethyl-1,3-pentylene glycol diisopropylformate, 1-trifluoromethyl-3-methyl-2,4-pentylene glycol dibenzoate, 2,4-pentylene glycol di-p-fluoromethylbenzoate, 2,4-pentylene glycol di-2-furancarboxylate, 2-methyl6-ene-2,4-heptylene glycol dibenzoate, 3-methyl6-ene-2,4-heptylene glycol dibenzoate, 4-methyl6-ene-2,4-heptylene glycol dibenzoate, 5-methyl6-ene-2,4-heptylene glycol dibenzoate, 6-methyl6-ene-2,4-heptylene glycol dibenzoate, 3-ethyl6-ene-2,4-heptylene glycol dibenzoate, 4-ethyl6-ene-2,4-heptylene glycol dibenzoate, 5-ethyl6-ene-2,4-heptylene glycol dibenzoate, 6-ethyl6-ene-2,4-heptylene glycol dibenzoate, 3-propyl6-ene-2,4-heptylene glycol dibenzoate, 4-propyl6-ene-2,4-heptylene glycol dibenzoate, 5-propyl6-ene-2,4-heptylene glycol dibenzoate, 6-propyl-6-ene-2,4-heptylene glycol dibenzoate, 3-butyl6-ene-2,4-heptylene glycol dibenzoate, 4-butyl6-ene-2,4-heptylene glycol dibenzoate, 5-butyl6-ene-2,4-heptylene glycol dibenzoate, 6-butyl6-ene-2,4-heptylene glycol dibenzoate, 3,5-dimethyl6-ene-2,4-heptylene glycol dibenzoate, 3,5-diethyl6-ene-2,4-heptylene glycol dibenzoate, 3,5-dipropyl6-ene-2,4-heptylene glycol dibenzoate, 3,5-dibutyl6-ene-2,4-heptylene glycol dibenzoate, 3,3-dimethyl6-ene-2,4-heptylene glycol dibenzoate, 3,3-diethyl6-ene-2,4-heptylene glycol dibenzoate, 3,3-dipropyl6-ene-2,4-heptylene glycol dibenzoate, 3,3-dibutyl6-ene-2,4-heptylene glycol dibenzoate, 3-ethyl-3,5-heptylene glycol dibenzoate, 4-ethyl-3,5-heptylene glycol dibenzoate, 5-ethyl-3,5-heptylene glycol dibenzoate, 3-propyl-3,5-heptylene glycol dibenzoate, 4-propyl-3,5-heptylene glycol dibenzoate, 3-butyl-3,5-heptylene glycol dibenzoate, 2,3-dimethyl-3,5-heptylene glycol dibenzoate, 2,4-dimethyl-3,5-heptylene glycol dibenzoate, 2,5-dimethyl-3,5-heptylene glycol dibenzoate, 2,6-dimethyl-3,5-heptylene glycol dibenzoate, 3,3-dimethyl-3,5-heptylene glycol dibenzoate, 4,4-dimethyl-3,5-heptylene glycol dibenzoate, 4,5-dimethyl-3,5-heptylene glycol dibenzoate, 4,6-dimethyl-3,5-heptylene glycol dibenzoate, 4,4-dimethyl-3,5-heptylene glycol dibenzoate, 6,6-dimethyl-3,5-heptylene glycol dibenzoate, 3-ethyl-2-methyl-3,5-heptylene glycol dibenzoate, 4-ethyl-2-methyl-3,5-heptylene glycol dibenzoate, 5-ethyl-2-methyl-3,5-heptylene glycol dibenzoate, 3-ethyl-3-methyl-3,5-heptylene glycol dibenzoate, 4-ethyl-3-methyl-3,5-heptylene glycol dibenzoate, 5-ethyl-3-methyl-3,5-heptylene glycol dibenzoate, 3-ethyl-4-methyl-3,5-heptylene glycol dibenzoate, 4-ethyl-4-methyl-3,5-heptylene glycol dibenzoate, 9,9-bis(benzoyloxymethyl)fluorene, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnoyloxymethyl)fluorene, 9-(benzoyloxymethyl)-9-(propionyloxymethyl)fluorene, 9,9-bis(propionyloxymethyl)fluorene, 9,9-bis(acryloyloxymethyl)fluorene, 9,9-bis(pivalyloxymethyl)fluorine, 2-(2-ethylhexyl)-1,3-dimethoxypropane, 2-isopropyl-1,3-dimethoxypropane, 2-butyl-1,3-dimethoxypropane, 2-secbutyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-p-chlorophenyl-1,3-dimethoxypropane, 2-diphenylmethyl-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-ethyl-2-methyl-1,3-dimethoxypropane, 2-methyl-2-isopropyl-1,3-dimethoxypropane, 2-methyl-2-phenyl-1,3-dimethoxypropane, 2-cyclohexyl-2-methyl-1,3-dimethoxypropane, 2,2-bis(2-cyclohexylethyl)-1,3-dimethoxypropane, 2-isobutyl-2-methyl-1,3-dimethoxypropane, 2-(2-ethylhexyl)-2-methyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopentyl-2-isopropyl-1,3-dimethoxypropane, 2-phenyl-2-isopropyl-1,3-dimethoxypropane, 2-sec-butyl-2-phenyl-1,3-dimethoxypropane, 2-benzyl-2-isopropyl-1,3-dimethoxypropane, 2-cyclopentyl-2-isopropyl-1,3-dimethoxypropane, 2-sec-butyl-2-cyclopentyl-1,3-dimethoxypropane, 2-cyclohexyl-2-isopropyl-1,3-dimethoxypropane, 2-sec-butyl-2-cyclohexyl-1,3-dimethoxypropane, 2-sec-butyl-2-isopropyl-1,3-dimethoxypropane, and 2-cyclohexyl-2-cyclohexylmethyl-1,3-dimethoxypropane.

17. A method for preparing a catalyst component, which method comprises the steps of:
  (1) providing the spherical carrier of claim 7 or the solid composition of claim 10; and
  (2) contacting and reacting the spherical carrier or solid composition with a titanium compound in the presence or absence of an inert solvent, and optionally adding at least one internal electron donor at one or more stages before, during and/or after the reaction.

18. The method according to claim 17, comprising the steps of:
  (1) preparing a solid composition by a process comprising:
    (a) reacting a magnesium halide of formula MgX$_2$ with an alcohol of formula R$_1$OH in the presence of at least one polymeric dispersion stabilizer at 30 to 160° C., to form a magnesium halide-alcohol adduct solution; and
    (b) reacting the magnesium halide-alcohol adduct solution with an epoxide represented by formula (2):

(2)

at 30 to 160° C., to form the solid composition,
  wherein, X is halogen; R$_1$ is a C$_1$-C$_{12}$ linear or branched alkyl; R$_2$ and R$_3$ are identical or different, and are independently hydrogen or unsubstituted or halogen-substituted C$_1$-C$_5$ linear or branched alkyl,
  the polymeric dispersion stabilizer is at least one chosen from styrene-maleic anhydride copolymers, polystyrene sulfonates, naphthalenesulfonic acid-formaldehyde condensation products, condensed alkyl phenyl ether sulfates, condensed alkylphenol poly oxyethylene ether phosphates, oxy alkyl acrylate copolymer-modified poly ethyleneimines, poly(1-dodecyl-4-vinylpyridinium bromide)s, poly(vinylbenzyl trimethyl ammonium salt)s, poly(vinyl alcohol)s, polyacrylamides, ethylene oxide-propylene oxide block copolymers, polyvinylpyrrolidones, poly(vinylpyrrolidone-co-vinyl acetate)s, poly(ethylene glycol)s, alkylphenyl polyoxyethylene ethers and poly(alkyl methylacrylate)s, and
  wherein, relative to one mole of the magnesium halide, the amount of the alcohol used ranges from 3 to 30 moles and the amount of the epoxide represented by the formula (2) used ranges from 1 to 10 moles; and the polymeric dispersion stabilizer is used in an amount of from 0.1 to 10 wt %, based on the total weight of the magnesium halide and the alcohol; and
  (2) contacting and reacting the solid composition from step (1) with a titanium compound in the presence or absence of an inert solvent, and optionally adding at least one internal electron donor at one or more stages before, during and/or after the reaction.

19. The method according to claim 18, having at least one of the following features:
  relative to one mole of the magnesium halide, the amount of the alcohol used ranges from 4 to 20 moles and the amount of the epoxide represented by the formula (2) used ranges from 2 to 6 moles; and the polymeric dispersion stabilizer is used in an amount of from 0.2 to 5 wt %, based on the total weight of the magnesium halide and the alcohol;
  the magnesium halide is at least one chosen from magnesium dichloride, magnesium dibromide and magnesium diiodide;
  the alcohol is at least one chosen from methanol, ethanol, propanol, isopropanol, n-butanol, isobutanol, pentanol, isopentanol, n-hexanol, n-octanol, and 2-ethylhexanol;
  the epoxide is at least one chosen from epoxy ethane, epoxy propane, epoxy butane, epoxy chloropropane, epoxy chlorobutane, epoxy bromopropane, and epoxy bromobutane;
  the polymeric dispersion stabilizer has a weight average molecular weight of larger than 1,000; and
  no inert dispersion medium is used in both step (a) and (b).

20. The method according to claim 18, wherein the step (2) is performed as follows: the solid composition from step (1) is brought into contact and reaction with an alkoxy titanium in the presence of a hydrocarbon solvent, the resultant intermediate reaction product is brought into contact and reaction with titanium tetrachloride and the internal electron donor compound, and then the resultant reaction product is washed with a hydrocarbon solvent, wherein the alkoxy titanium is represented by a general formula: Ti(OR$_4$)$_{4-a}$X$_a$, wherein R$_4$ is a C$_1$-C$_{14}$ aliphatic hydrocarbyl, X is halogen, and a is an integer ranging from 0 to 3.

21. The method according to claim 20, wherein the alkoxy titanium is used in an amount of from 0.05 to 1.5 moles, relative to one mole of magnesium.

22. A catalyst for olefin polymerization, comprising:
  (i) the catalyst component for olefin polymerization of claim 13;
  (ii) at least one alkyl aluminum compound; and
  (iii) optionally, at least one external electron donor.

23. A method for polymerizing olefin(s), comprising contacting an olefin of formula CH$_2$=CHR, wherein R is hydrogen, C$_1$-C$_6$ alkyl or C$_6$-C$_{12}$ aryl, and optionally a comonomer with the catalyst of claim 22 under polymerization conditions, to form an olefin polymer; and recovering the resultant olefin polymer.

* * * * *